(12) United States Patent
Maeda

(10) Patent No.: US 11,458,546 B2
(45) Date of Patent: Oct. 4, 2022

(54) THROWAWAY INSERT

(71) Applicant: SUMITOMO ELECTRIC SINTERED ALLOY, LTD., Takahashi (JP)

(72) Inventor: Kazuo Maeda, Takahashi (JP)

(73) Assignee: Sumitomo Electric Sintered Alloy, Ltd., Takahashi (JP)

( * ) Notice: Subject to any disclaimer, the term of this patent is extended or adjusted under 35 U.S.C. 154(b) by 502 days.

(21) Appl. No.: 16/470,138

(22) PCT Filed: Feb. 2, 2017

(86) PCT No.: PCT/JP2017/003716
§ 371 (c)(1),
(2) Date: Jun. 14, 2019

(87) PCT Pub. No.: WO2018/109954
PCT Pub. Date: Jun. 21, 2018

(65) Prior Publication Data
US 2020/0009663 A1    Jan. 9, 2020

(30) Foreign Application Priority Data
Dec. 15, 2016   (JP) .............................. JP2016-243351

(51) Int. Cl.
*B23B 27/14*    (2006.01)
*B23B 27/20*    (2006.01)

(52) U.S. Cl.
CPC ............ *B23B 27/20* (2013.01); *B23B 27/145* (2013.01); *B23B 2200/049* (2013.01);
(Continued)

(58) Field of Classification Search
CPC ..... B24B 3/343; B24B 3/34; B23B 2200/049; B23B 2200/085; B23B 2200/245;
(Continued)

(56) References Cited

U.S. PATENT DOCUMENTS 6,655,881 B2 * 12/2003 Shimizu ................ B23B 27/145
                                                                    407/113
11,338,371 B2 * 5/2022 Moroguchi ........... B23B 27/145
(Continued)

FOREIGN PATENT DOCUMENTS

EP          1886749 A1    2/2008
JP          58-004302 A   1/1983
(Continued)

*Primary Examiner* — Sara Addisu
(74) *Attorney, Agent, or Firm* — Baker Botts L.L.P.; Michael A. Sartori

(57) ABSTRACT

The throwaway insert includes a base and a cutting edge member. The cutting edge member includes a rake face, a flank face, a first connecting face, a second connecting face, and a first ridgeline serving as a cutting edge. The rake face includes a main surface and a first chamfer provided at an edge tip portion of the cutting edge member, the edge tip portion including an extreme tip portion of the cutting edge member. In a plan view from an upper surface of the base, the flank face, the first connecting face, and the second connecting face are located external to the base. The first chamfer is inclined relative to the main surface so as to increase a thickness of the cutting edge member as the first chamfer is closer to the main surface.

12 Claims, 13 Drawing Sheets

(52) U.S. Cl.
CPC ... *B23B 2200/085* (2013.01); *B23B 2200/201* (2013.01); *B23B 2200/242* (2013.01)

(58) Field of Classification Search
CPC .............. B23B 2240/08; B23B 27/145; B23B 2200/0447; B23B 2200/283; B23B 2226/315; B23B 27/20; B23B 2226/125; B23B 2226/18; B23B 2200/083; B23B 2200/201; B23B 2200/242

See application file for complete search history.

(56) References Cited

U.S. PATENT DOCUMENTS

| | | | | |
|---|---|---|---|---|
| 2002/0127068 | A1* | 9/2002 | Kinukawa | B23B 27/145 407/113 |
| 2006/0188347 | A1* | 8/2006 | Kratz | B23B 27/145 407/113 |
| 2006/0228179 | A1* | 10/2006 | Alm | B23B 27/145 407/119 |
| 2008/0025802 | A1* | 1/2008 | Kukino | B23B 27/145 419/13 |
| 2008/0292415 | A1* | 11/2008 | Kuroda | B23B 27/145 83/53 |
| 2012/0282048 | A1* | 11/2012 | Kountanya | B23B 27/145 407/113 |
| 2015/0202730 | A1* | 7/2015 | Watanobe | B23B 27/18 451/28 |
| 2016/0297010 | A1* | 10/2016 | Kukino | B24B 3/34 |
| 2018/0009040 | A1* | 1/2018 | Sasaki | B23B 27/22 |

FOREIGN PATENT DOCUMENTS

| | | | |
|---|---|---|---|
| JP | 61178101 A | * | 8/1986 |
| JP | H01-164003 U | | 11/1989 |
| JP | H05-000302 U | | 1/1993 |
| JP | H10-193203 A | | 7/1998 |
| JP | H11-320219 A | | 11/1999 |
| JP | 2009-202244 A | | 9/2009 |
| WO | 2007/039944 A1 | | 4/2007 |

* cited by examiner

US 11,458,546 B2

THROWAWAY INSERT

TECHNICAL FIELD

The present invention relates to a throwaway insert. The present application claims a priority based on Japanese Patent Application No. 2016-243351 filed on Dec. 15, 2016, the entire content of which is incorporated herein by reference.

BACKGROUND ART

Japanese Patent Laying-Open No. 11-320219 (Patent Literature 1) discloses a throwaway insert including: a base (base material) having a corner portion provided with a recess; and a cutting edge member (hard sintered material) joined to the recess. The cutting edge member includes: an upper surface; a first side surface flush with a side surface of the base; and a second side surface facing a side surface of the recess. This cutting edge member includes: a first ridgeline formed by the upper surface and the first side surface and serving as a cutting edge; and a second ridgeline formed by the upper surface and the second side surface. The first ridgeline crosses the second ridgeline at an acute angle.

CITATION LIST

Patent Literature

PTL 1: Japanese Patent Laying-Open No. 11-320219

SUMMARY OF INVENTION

A throwaway insert according to one embodiment of the present invention includes a base and a cutting edge member. The base has an upper surface, a lower surface, and a plurality of side surfaces that connect the upper surface to the lower surface, the base being provided with a recess at a corner portion at which the upper surface crosses two side surfaces of the plurality of side surfaces. The cutting edge member is joined to the recess. The cutting edge member includes: a rake face; a flank face extending to cross the rake face; a first connecting face; a second connecting face; and a first ridgeline serving as a cutting edge. The first connecting face connects the flank face to one side surface of the two side surfaces and extends to cross the rake face. The second connecting face connects the flank face to the other side surface of the two side surfaces and extends to cross the rake face. The first ridgeline is formed by the rake face and the flank face. The rake face includes: a main surface extending along the upper surface; and a first chamfer provided at an edge tip portion of the cutting edge member, the edge tip portion including an extreme tip portion of the cutting edge member. The cutting edge includes a first cutting edge part constituted of a first ridgeline part formed by the first chamfer and the flank face. In a plan view from the upper surface of the base, the flank face, the first connecting face, and the second connecting face are located external to the base. The first chamfer is inclined relative to the main surface so as to increase a thickness of the cutting edge member as the first chamfer is closer to the main surface.

DETAILED DESCRIPTION

Figure 1:
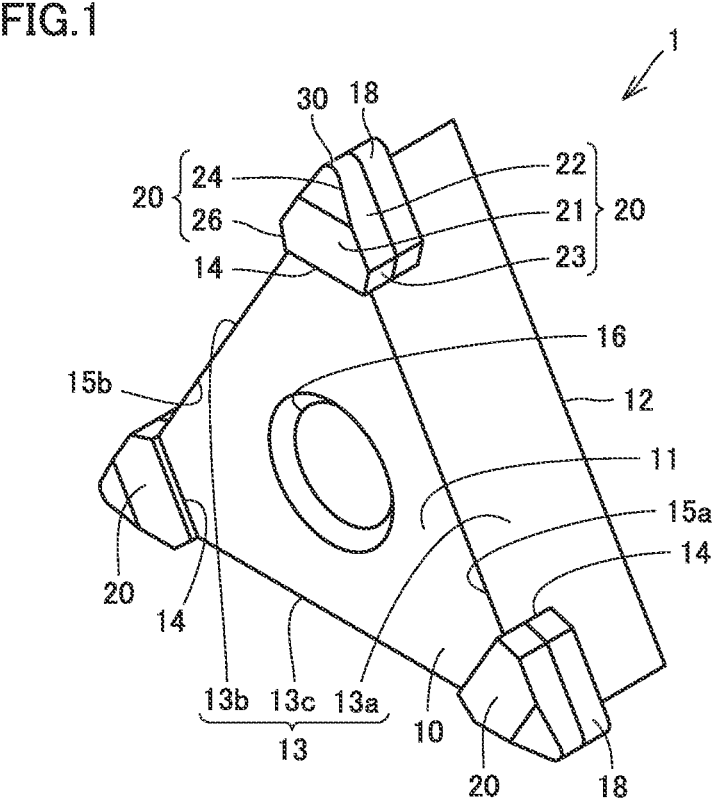
FIG. 1 is a schematic perspective view of a throwaway insert according to a first embodiment.
Figure 2:
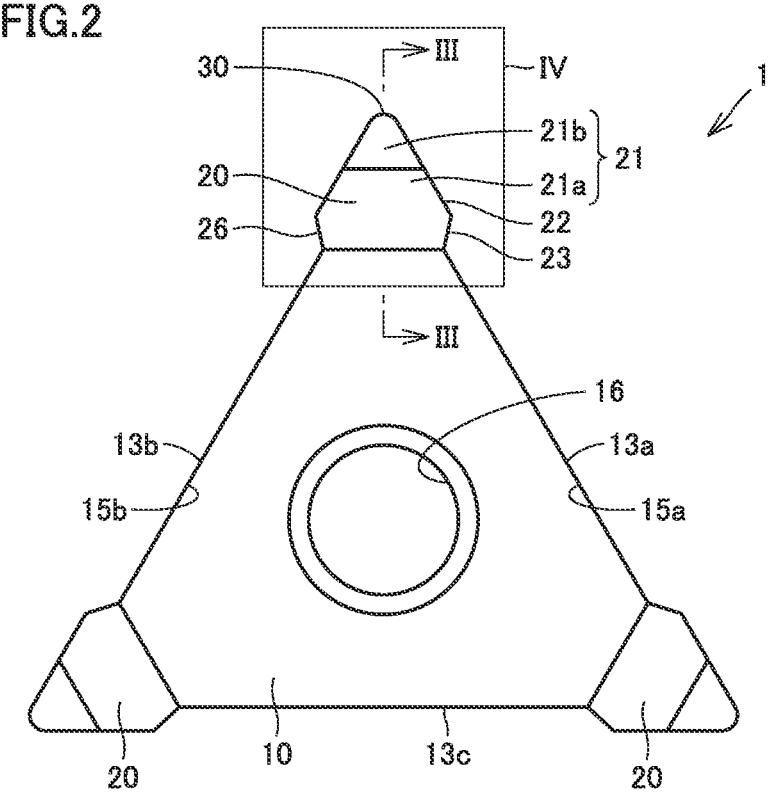
FIG. 2 is a schematic plan view of the throwaway insert according to the first embodiment.

Problems to be Solved by the Present Disclosure

The cutting edge member is likely to be chipped when the cutting edge member of the throwaway insert described in Patent Literature 1 is ground and when a workpiece is cut using the throwaway insert described in Patent Literature 1.

Moreover, in the throwaway insert described in Patent Literature 1, it is difficult to increase the number of times of reusing the cutting edge member (the number of times of grinding the cutting edge member).

An object of one embodiment of the present invention is to provide a throwaway insert having stable quality and including a cutting edge member that can be reused a larger number of times.

Advantageous Effect of the Present Disclosure

According to one embodiment of the present invention, there can be provided a throwaway insert having stable quality and including a cutting edge member that can be reused a larger number of times.

DESCRIPTION OF EMBODIMENTS

First, embodiments of the present invention are listed and described.

(1) A throwaway insert 1, 2, 3, 4 according to one embodiment of the present invention includes a base 10, 10c and a cutting edge member 20, 20b, 20c, 20d. Base 10, 10c has an upper surface 11, a lower surface 12, and a plurality of side surfaces 13 that connect upper surface 11 to lower surface 12, base 10, 10c being provided with a recess 14 at a corner portion at which upper surface 11 crosses two side surfaces (13a, 13b) of the plurality of side surfaces 13. Cutting edge member 20, 20b, 20c, 20d is joined to recess 14. Cutting edge member 20, 20b, 20c, 20d includes: a rake face 21, 121; a flank face 22, 22c extending to cross rake face 21, 121; a first connecting face 23; a second connecting face 26; and a first ridgeline (24, 124) serving as a cutting edge 24, 124. First connecting face 23 connects flank face 22, 22c to one side surface 13a of the two side surfaces (13a, 13b) and extends to cross rake face 21, 121. Second connecting face 26 connects flank face 22, 22c to the other side surface 13b of two side surfaces (13a, 13b) and extends to cross rake face 21, 121. The first ridgeline (24, 124) is formed by rake face 21, 121 and flank face 22, 22c. Rake face 21, 121 includes: a main surface 21a, 121a extending along upper surface 11; and a first chamfer 21b, 121b provided at an edge tip portion of cutting edge member 20, 20b, 20c, 20d, the edge tip portion including an extreme tip portion 30 of cutting edge member 20, 20b, 20c, 20d. Cutting edge 24, 124 includes a first cutting edge part 24d, 124d constituted of a first ridgeline part (24d, 124d) formed by first chamfer 21b, 121b and flank face 22, 22c. In a plan view from upper surface 11 of base 10, 10c, flank face 22, 22c, first connecting face 23, and second connecting face 26 are located external to base 10, 10c. First chamfer 21b, 121b is inclined relative to main surface 21a, 121a so as to increase a thickness of cutting edge member 20, 20b, 20c, 20d as first chamfer 21b, 121b is closer to main surface 21a, 121a.

First chamfer 21b, 121b is provided at the edge tip portion of cutting edge member 20, 20b, 20c, 20d, the edge tip portion including extreme tip portion 30 of cutting edge member 20, 20b, 20c, 20d. Hence, a damage portion 40, 140 such as breakage and chipping can be suppressed from being produced in cutting edge 24, 124. Throwaway insert 1, 2, 3, 4 has stable quality.

In the plan view from upper surface 11 of base 10, 10c, flank face 22, 22c, first connecting face 23, and second connecting face 26 are located external to base 10, 10c. Therefore, when damage portion 40, 140 such as breakage and chipping is produced in cutting edge 24, 124, damage portion 40, 140 can be removed by grinding flank face 22, 22c of cutting edge member 20, 20b, 20c, 20d. According to throwaway insert 1, 2, 3, 4, the number of times of reusing cutting edge member 20, 20b, 20c, 20d can be increased, whereby throwaway insert 1, 2, 3, 4 can be used economically.

First chamfer 21b, 121b is inclined relative to main surface 21a, 121a so as to increase the thickness of cutting edge member 20, 20b, 20c, 20d as first chamfer 21b, 121b is closer to main surface 21a, 121a. Accordingly, when flank face 22, 22c is ground in order to remove damage portion 40, 140, the thickness of cutting edge member 20, 20b, 20c, 20d at the first ridgeline (24, 124) serving as cutting edge 24, 124 is increased, whereby damage portion 40, 140 such as breakage and chipping is less likely to be produced in cutting edge 24, 124. Throwaway insert 1, 2, 3, 4 has stable quality.

(2) In throwaway insert 2, 4 according to (1), rake face 121 further includes a second chamfer 121c, 121d connected to main surface 121a, first chamfer 121b, and flank face 22, 22c. Second chamfer 121c, 121d is inclined relative to main surface 121a so as to increase the thickness of cutting edge member 20b, 20d as second chamfer 121c, 121d is closer to main surface 121a. Cutting edge 124 includes a second cutting edge part 124e, 124f constituted of a second ridgeline part (124e, 124f) formed by second chamfer 121c, 121d and flank face 22, 22c. In the plan view from upper surface 11 of base 10, 10c, a first distance $d_1$ between extreme tip portion 30 of cutting edge member 20b, 20d and base 10, 10c is larger than a second distance $d_2$ between second cutting edge part 124e, 124f and base 10, 10c.

In throwaway insert 2, 4, rake face 121 further includes second chamfer 121c, 121d. Accordingly, when cutting edge member 20b, 20d is ground and when a workpiece is cut using throwaway insert 2, 4, damage portion 40, 140 such as breakage and chipping can be further suppressed from being produced in cutting edge 124. Throwaway insert 2, 4 has more stable quality.

In throwaway insert 2, 4, second chamfer 121c, 121d is inclined relative to main surface 121a so as to increase the thickness of cutting edge member 20b, 20d as second chamfer 121c, 121d is closer to main surface 121a. Accordingly, when flank face 22, 22c is ground in order to remove damage portion 40, 140, the thickness of cutting edge member 20b, 20d at the first ridgeline (124) serving as cutting edge 124 is increased, whereby damage portion 40, 140 is less likely to be produced in cutting edge 124. Throwaway insert 2, 4 has stable quality.

Extreme tip portion 30 of cutting edge member 20b is a portion used most to cut a workpiece, and is a portion at which damage portion 40 is most likely to be produced. Since first distance $d_1$ is larger than second distance $d_2$ in the plan view from upper surface 11 of base 10, 10c, the number of times of reusing cutting edge member 20b, 20d can be increased. Throwaway insert 2, 4 can be used economically.

(3) In throwaway insert 2, 4 according to (2), a first angle $\theta_1$ between first chamfer 121b and a first extension plane 121e of main surface 121a is smaller than a second angle $\theta2$ between second chamfer 121c, 121d and first extension plane 121e of main surface 121a. Therefore, in the plan view from upper surface 11 of base 10, 10c, first distance $d_1$ is larger than second distance dz. According to throwaway insert 2, 4, the number of times of reusing cutting edge member 20b, 20d can be increased, whereby throwaway insert 2, 4 can be used economically.

(4) In throwaway insert 1, 2, 3, 4 according to (1) or (2), a first angle $\theta_1$ between first chamfer 21b, 121b and a first extension plane 21e, 121e of main surface 21a, 121a is more than or equal to 3° and less than or equal to 25°. By setting first angle θ1 to be more than or equal to 3°, damage portion 40 such as breakage and chipping can be suppressed from being produced in cutting edge 24, 124, and burr can be suppressed from being produced in a workpiece during cutting of the workpiece. Accordingly, throwaway insert 1, 2, 3, 4 has stable quality.

By setting first angle θ1 to be less than or equal to 25°, even after grinding cutting edge member 20, 20b, 20c, 20d, the cutting edge strength can be secured and a workpiece can be cut with high cutting precision in the same manner as before grinding cutting edge member 20, 20b, 20c, 20d. The cutting performance of cutting edge member 20, 20b, 20c, 20d can be suppressed from being deteriorated after grinding cutting edge member 20, 20b, 20c, 20d.

(5) In throwaway insert 1, 2, 3, 4 according to any one of (1) to (4), extreme tip portion 30 of cutting edge member 20, 20b, 20c, 20d is located on a second extension plane 11e of upper surface 11. Accordingly, even after grinding cutting edge member 20, 20b, 20c, 20d, a workpiece can be cut with high cutting precision in the same manner as before grinding cutting edge member 20, 20b, 20c, 20d. The cutting performance of cutting edge member 20, 20b, 20c, 20d can be suppressed from being deteriorated after grinding cutting edge member 20, 20b, 20c, 20d.

(6) In throwaway insert 3, 4 according to any one of (1) to (5), in the plan view from main surface 21a, 121a, flank face 22c is inclined relative to main surface 21a, 121a so as to be closer to the two side surfaces (13a, 13b) of base 10c as flank face 22c is further away from main surface 21a, 121a. Accordingly, a flank amount of flank face 22c relative to a workpiece can be increased. Flank face 22c is suppressed from being worn during cutting, whereby throwaway insert 3, 4 has a longer life. Further, cuttability of cutting edge 24, 124 is improved. Even though cutting edge member 20c, 20d protrudes relative to the two side surfaces (13a, 13b) of base 10c, occurrence of chatter vibration can be suppressed during cutting of a workpiece, thereby suppressing decrease of cutting precision.

(7) In throwaway insert 3, 4 according to (6), flank face 22c is inclined at an inclination angle θ5 of more than or equal to 0.1° and less than or equal to 15° relative to an imaginary plane 21v, 121v that is orthogonal to main surface 21a, 121a and that is in contact with the first ridgeline (24, 124). By setting inclination angle θ5 of flank face 22c to be more than or equal to 0.1°, wear of flank face 22c of cutting edge member 20c, 20d and occurrence of chatter vibration during cutting can be further suppressed. By setting inclination angle θ5 to be less than or equal to 15°, flank face 22c can be ground using a grindstone without an interference of the grindstone with base 10, 10c.

(8) In throwaway insert 1, 2, 3, 4 according to any one of (1) to (7), a second ridgeline 25, 125 formed by rake face 21, 121 and first connecting face 23 crosses the first ridgeline (24, 124) at an obtuse angle. A third ridgeline 27, 127 formed by rake face 21, 121 and second connecting face 26 crosses the first ridgeline (24, 124) at an obtuse angle. Accordingly, cutting edge member 20, 20b, 20c, 20d can be suppressed from being chipped. Throwaway insert 1, 2, 3, 4 has stable quality.

(9) In throwaway insert 1, 2, 3, 4 according to (8), cutting edge 24, 124 includes: a first straight cutting edge portion 24a, 124a located between first connecting face 23 and first cutting edge part 24d, 124d; and a second straight cutting edge portion 24c, 124c located between second connecting face 26 and first cutting edge part 24d, 124d. When γ (degree) represents an angle between first straight cutting edge portion 24a, 124a and second straight cutting edge portion 24c, 124c in the plan view from upper surface 11 of base 10, 10c, each of a first crossing angle α (degree) between the first ridgeline (24, 124) and second ridgeline 25, 125 and a second crossing angle δ (degree) between the first ridgeline (24, 124) and third ridgeline 27, 127 is more than or equal to (160-γ/2) and less than or equal to (200-γ/2). Therefore, a change in cutting depth of cutting edge member 20, 20b, 20c, 20d into a workpiece before and after grinding of cutting edge member 20, 20b, 20c, 20d can be further decreased.

(10) In throwaway insert 1, 2, 3, 4 according to any one of (1) to (8), cutting edge 24, 124 includes: a first straight cutting edge portion 24a, 124a located between first connecting face 23 and first cutting edge part 24d, 124d; and a second straight cutting edge portion 24c, 124c located between second connecting face 26 and first cutting edge part 24d, 124d. First straight cutting edge portion 24a, 124a is parallel to a first base ridgeline 15a formed by upper surface 11 and one side surface 13a of base 10, 10c. Second straight cutting edge portion 24c, 124c is parallel to a second base ridgeline 15b formed by upper surface 11 and the other side surface 13b of base 10, 10c.

Therefore, cutting edge 24, 124 can be positioned relative to a workpiece with high precision. Precision in cutting a workpiece by throwaway insert 1, 2, 3, 4 can be improved. Cutting edge 24, 124 can be positioned relative to a grindstone with high precision. Precision in grinding cutting edge member 20, 20b, 20c, 20d is improved, thereby obtaining high-quality cutting edge 24, 124.

(11) In throwaway insert 1, 2, 3, 4 according to (10), in the plan view from upper surface 11 of base 10, 10c, a third distance $d_3$ between first straight cutting edge portion 24a, 124a and first base ridgeline 15a is more than or equal to 0.01 mm and less than or equal to 1 mm. In the plan view from upper surface 11 of base 10, 10c, a fourth distance $d_4$ between second straight cutting edge portion 24c, 124c and second base ridgeline 15b is more than or equal to 0.01 mm and less than or equal to 1 mm.

By setting each of third distance $d_3$ and fourth distance $d_4$ to be less than or equal to 1 mm in the plan view from upper surface 11 of base 10, 10c, the rigidity of cutting edge member 20, 20b, 20c, 20d can be suppressed from being greatly decreased. Accordingly, when cutting a workpiece, chipping of cutting edge member 20, 20b, 20c, 20d and decrease in cutting precision can be suppressed. By setting third distance $d_3$ and fourth distance $d_4$ to be more than or equal to 0.01 mm in the plan view from upper surface 11 of base 10, 10c, flank face 22, 22c of cutting edge member 20, 20b, 20c, 20d can be ground while securely preventing grinding of base 10, 10c. Clogging in a grindstone and cracking in throwaway insert 1, 2, 3, 4 can be securely prevented from occurring due to swarf of base 10, 10c during grinding of cutting edge member 20, 20b, 20c, 20d.

(12) In throwaway insert 1, 2, 3, 4 according to any one of (1) to (11), first cutting edge part 24d, 124d includes a curved cutting edge portion 24b, 124b having a protruding curved shape. Curved cutting edge portion 24b, 124b includes extreme tip portion 30. Accordingly, damage portion 40, 140 such as breakage and chipping can be suppressed from being produced in extreme tip portion 30 of throwaway insert 1, 2, 3, 4. Throwaway insert 1, 2, 3, 4 has stable quality.

(13) In throwaway insert 1, 2, 3, 4 according to any one of (1) to (12), cutting edge member 20, 20b, 20c, 20d includes one of the following materials: diamond, cubic boron nitride, cemented carbide and cermet. Throwaway insert 1, 2, 3, 4 can be used to highly precisely cut workpieces having various hardnesses, such as high-hardness materials or non-iron soft metals.

DETAILS OF EMBODIMENT OF THE PRESENT INVENTION

The following describes details of embodiments of the present invention with reference to figures. It should be noted that in the below-mentioned figures, the same or corresponding portions are given the same reference characters and are not described repeatedly. Moreover, at least a part of configurations of the embodiments described below may be appropriately combined.

First Embodiment

As shown in FIG. 1 to FIG. 4, a throwaway insert 1 according to the present embodiment mainly includes a base 10 and a cutting edge member 20. Throwaway insert 1 according to the present embodiment may further include a backing body 18.

Base 10 has an upper surface 11, a lower surface 12, and a plurality of side surfaces 13 that connect upper surface 11 to lower surface 12. In the present embodiment, in a plan view from upper surface 11 of base 10, base 10 may have a regular triangle shape. In the present specification, the plan view from upper surface 11 of base 10 means viewing in a direction perpendicular to upper surface 11 of base 10. The plurality of side surfaces 13 may include a side surface 13a, a side surface 13b, and a side surface 13c. In the plan view from upper surface 11 of base 10, base 10 may have a polygonal shape such as a rhombus shape (see FIG. 14, FIG. 15, FIG. 18 and FIG. 19), a square shape, a regular pentagon shape, a right hexagon shape or the like.

Further, base 10 is provided with a recess 14 at a corner portion at which upper surface 11 crosses two side surfaces (13a, 13b) of the plurality of side surfaces 13. Particularly, base 10 is provided with respective recesses 14 at a first corner portion at which upper surface 11 crosses two side surfaces (13a, 13b), a second corner portion at which upper surface 11 crosses two side surfaces (13b, 13c), and a third corner portion at which upper surface 11 crosses two side surfaces (13c, 13a). Recesses 14 may be provided at all the corner portions at each of which upper surface 11 crosses two side surfaces of the plurality of side surfaces 13. Recess 14 may be provided at at least one of all the corner portions at each of which upper surface 11 crosses two side surfaces of the plurality of side surfaces 13.

Base 10 further includes: a first base ridgeline 15a formed by upper surface 11 and one side surface 13a of the two side surfaces (13a, 13b); and a second base ridgeline 15b formed by upper surface 11 and the other side surface 13b of the two side surfaces (13a, 13b). Base 10 is also provided with a through hole 16 extending between the central portion of upper surface 11 and the central portion of lower surface 12. By fitting a screw or a pressing member into hole 16, throwaway insert 1 may be attached to a holder (not shown) for cutting or a holder (not shown) for grinding. Cemented carbide may be used as a material of base 10. Base 10 may be composed of a material having a toughness higher than that of cutting edge member 20.

Cutting edge member 20 is joined to recess 14 of base 10 using a brazing material or the like. Cutting edge member 20 may be joined to recess 14 of base 10 at the entire surface of recess 14 of base 10. In the present embodiment, recesses 14 are provided at the first corner portion, second corner portion, and third corner portion of base 10. Cutting edge member 20 may be joined to at least one of these recesses 14.

Cutting edge member 20 includes: a rake face 21; a flank face 22 extending to cross rake face 21; a first connecting face 23; a second connecting face 26; and a first ridgeline (24) serving as a cutting edge 24. First connecting face 23 connects flank face 22 to one side surface 13a of the two side surfaces (13a, 13b), and extends to cross rake face 21. Second connecting face 26 connects flank face 22 to the other side surface 13b of the two side surfaces (13a, 13b), and extends to cross rake face 21. The first ridgeline (24) is formed by rake face 21 and flank face 22.

Figure 4:
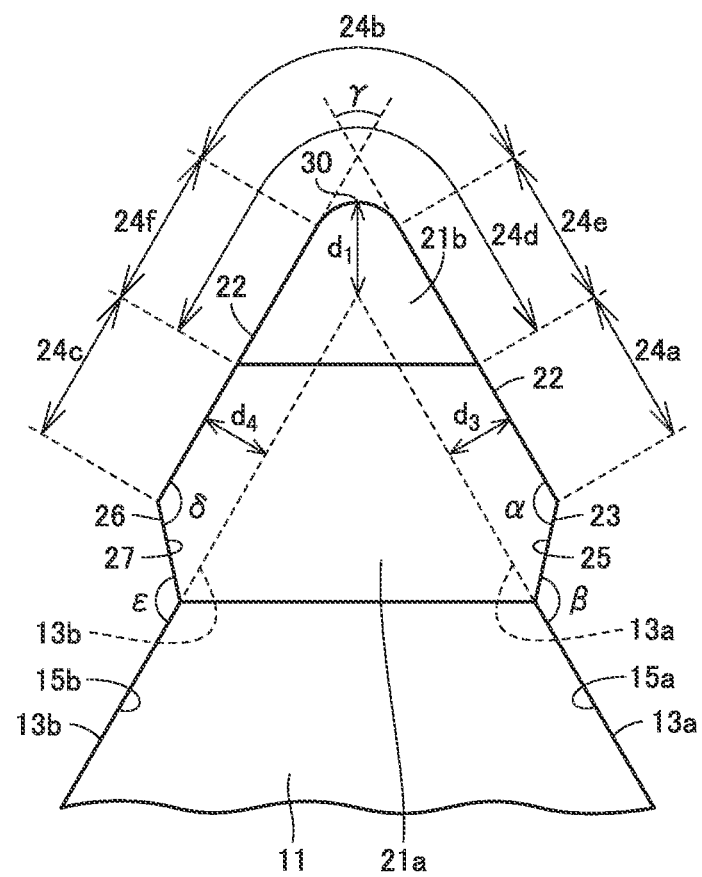
FIG. 4 is a schematic enlarged plan view of the throwaway insert according to the first embodiment at a region IV shown in FIG. 2.

As shown in FIG. 4, cutting edge member 20 further includes: a second ridgeline 25 formed by rake face 21 and first connecting face 23; and a third ridgeline 27 formed by rake face 21 and second connecting face 26. As shown in FIG. 4, second ridgeline 25 may cross the first ridgeline (24) at a first crossing angle α, which is an obtuse angle. First crossing angle α between the first ridgeline (24) and second ridgeline 25 is desirably more than or equal to 110° and less than or equal to 165°, and is more desirably more than or equal to 130° and less than or equal to 150°. In the plan view from upper surface 11 of base 10, an angle β between second ridgeline 25 and first base ridgeline 15a is desirably more than or equal to 110° and less than or equal to 165°, and is more desirably more than or equal to 130° and less than or equal to 150°. Angle β between second ridgeline 25 and first base ridgeline 15a may be equal to first crossing angle α between the first ridgeline (24) and second ridgeline 25.

As shown in FIG. 4, third ridgeline 27 may cross the first ridgeline (24) at a second crossing angle δ, which is an obtuse angle. Second crossing angle δ between the first ridgeline (24) and third ridgeline 27 is desirably more than or equal to 110° and less than or equal to 165°, and is more desirably more than or equal to 130° and less than or equal to 150°. In the plan view from upper surface 11 of base 10, an angle ε between third ridgeline 27 and second base ridgeline 15b is desirably more than or equal to 110° and less than or equal to 165°, and is more desirably more than or equal to 130° and less than or equal to 150°. Angle ε between third ridgeline 27 and second base ridgeline 15b may be equal to second crossing angle δ between the first ridgeline (24) and third ridgeline 27. Second crossing angle δ between the first ridgeline (24) and third ridgeline 27 may be equal to first crossing angle α between the first ridgeline (24) and second ridgeline 25. Angle ε between third ridgeline 27 and second base ridgeline 15b may be equal to angle β between second ridgeline 25 and first base ridgeline 15a.

Figure 3:
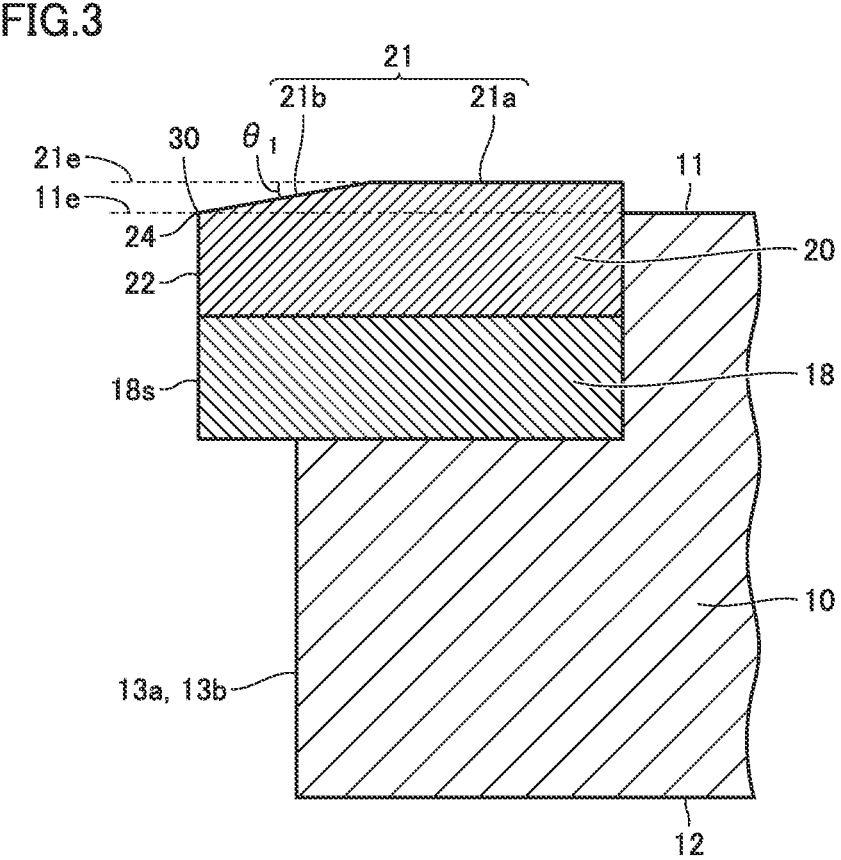
FIG. 3 is a schematic partial cross sectional view of the throwaway insert according to the first embodiment along a cross sectional line shown in FIG. 2.

Rake face 21 includes: a main surface 21a extending along upper surface 11; and a first chamfer 21b provided at an edge tip portion of cutting edge member 20, the edge tip portion including an extreme tip portion 30 of cutting edge member 20. In the present specification, the expression "main surface 21a extends along upper surface 11" means that the main extending direction of main surface 21a is the same as the main extending direction of upper surface 11. Specifically, in FIG. 2 and FIG. 4, each of the main extending direction of main surface 21a and the main extending direction of upper surface 11 corresponds to an inward direction in the plane of sheet. The expression "main surface 21a extends along upper surface 11" encompasses a case where main surface 21a is not flush with upper surface 11. As shown in FIG. 1 and FIG. 3, main surface 21a may protrude relative to upper surface 11. The expression "main surface 21a extends along upper surface 11" encompasses both the following cases: a case where main surface 21a is parallel to upper surface 11; and a case where main surface 21a is not parallel to upper surface 11.

As shown in FIG. 3, extreme tip portion 30 of cutting edge member 20 may be located on a second extension plane 11e of upper surface 11. As shown in FIG. 4, in the plan view from upper surface 11 of base 10, a first distance $d_1$ between extreme tip portion 30 of cutting edge member 20 and base 10 is larger than a third distance $d_3$ between first straight cutting edge portion 24a and first base ridgeline 15a. In the present specification, first distance $d_1$ is defined as a minimum distance between extreme tip portion 30 of cutting edge member 20 and base 10 when upper surface 11 of base 10 is seen in the direction perpendicular to upper surface 11 of base 10. Third distance $d_3$ is defined as a minimum distance between the first ridgeline (24) and an extension line of first base ridgeline 15a when upper surface 11 of base 10 is seen in the direction perpendicular to upper surface 11 of base 10.

In the plan view from upper surface 11 of base 10, first distance $d_1$ between extreme tip portion 30 of cutting edge member 20 and base 10 is larger than a fourth distance $d_4$ between second straight cutting edge portion 24c and second base ridgeline 15b. Fourth distance $d_4$ is defined as a minimum distance between the first ridgeline (24) and the extension line of second base ridgeline 15b when upper surface 11 of base 10 is seen in the direction perpendicular to upper surface 11 of base 10.

As shown in FIG. 3, first chamfer 21b is inclined relative to main surface 21a so as to increase the thickness of cutting edge member 20 as first chamfer 21b is closer to main surface 21a. A first angle θ1 between first chamfer 21b and first extension plane 21e of main surface 21a may be more than or equal to 3°, may be preferably more than or equal to 5°, and may be more preferably more than or equal to 7°. By setting first angle $θ_1$ to be more than or equal to 3°, a damage portion 40 (see FIG. 6) such as breakage and chipping can be suppressed from being produced in cutting edge 24, and burr can be suppressed from being produced in a workpiece during cutting of the workpiece. Accordingly, throwaway insert 1 of the present embodiment has stable quality.

First angle $θ_1$ between first chamfer 21b and first extension plane 21e of main surface 21a may be less than or equal to 25°, may be preferably less than or equal to 15°, and may be more preferably less than or equal to 10°. By setting first angle $θ_1$ to be less than or equal to 25°, the thickness of cutting edge member 20 can be prevented from being greatly varied before and after grinding of cutting edge member 20. In the present specification, the thickness of cutting edge member 20 is defined as the length of cutting edge member 20 in the direction perpendicular to main surface 21a. The center height of cutting edge 24 can be prevented from being greatly varied before and after grinding of cutting edge member 20. Accordingly, even after grinding cutting edge member 20, the cutting edge strength can be secured and a workpiece can be cut with high cutting precision in the same manner as before grinding cutting edge member 20. The cutting performance of cutting edge member 20 can be suppressed from being deteriorated after grinding cutting edge member 20.

Cutting edge 24 includes a first cutting edge part 24d constituted of a first ridgeline part (24d) formed by first chamfer 21b and flank face 22. First cutting edge part 24d includes extreme tip portion 30 of cutting edge member 20. In the plan view from upper surface 11 of base 10, flank face 22, first connecting face 23, and second connecting face 26 are located external to base 10 or the two side surfaces (13a, 13b). In the plan view from upper surface 11 of base 10, cutting edge member 20 may cover recess 14 entirely.

As shown in FIG. 4, cutting edge 24 includes: a first straight cutting edge portion 24a located between first connecting face 23 and first cutting edge part 24d; and a second straight cutting edge portion 24c located between second connecting face 26 and first cutting edge part 24d. First straight cutting edge portion 24a and second straight cutting edge portion 24c may be formed by main surface 21a and flank face 22. When γ (degree) represents an angle between first straight cutting edge portion 24a and second straight cutting edge portion 24c in the plan view from upper surface 11 of base 10, each of first crossing angle α (degree) between the first ridgeline (24) and second ridgeline 25 and second crossing angle δ (degree) between the first ridgeline (24) and third ridgeline 27 may be preferably more than or equal to (160-γ/2) and less than or equal to (200-γ/2), and may be more preferably more than or equal to (170-γ/2) and less than or equal to (190-γ/2).

First straight cutting edge portion 24a may be connected to first connecting face 23. First straight cutting edge portion 24a may be connected to second ridgeline 25. Second straight cutting edge portion 24c may be connected to second connecting face 26. Second straight cutting edge portion 24c may be connected to third ridgeline 27. First straight cutting edge portion 24a may be parallel to first base ridgeline 15a formed by upper surface 11 and one side surface 13a of base 10. Second straight cutting edge portion 24c may be parallel to second base ridgeline 15b formed by upper surface 11 and the other side surface 13b of base 10.

In the plan view from upper surface 11 of base 10, third distance $d_3$ between first straight cutting edge portion 24a and first base ridgeline 15a is desirably more than or equal to 0.01 mm and less than or equal to 1 mm, and is more desirably more than or equal to 0.1 mm and less than or equal to 0.6 mm. In the present specification, third distance $d_3$ in the plan view from upper surface 11 of base 10 is defined as a distance between first straight cutting edge portion 24a and the extension line of first base ridgeline 15a when upper surface 11 of base 10 is seen in the direction perpendicular to upper surface 11 of base 10. In the plan view from upper surface 11 of base 10, fourth distance $d_4$ between second straight cutting edge portion 24c and second base ridgeline 15b is desirably more than or equal to 0.01 mm and less than or equal to 1 mm, and is more desirably more than or equal to 0.1 mm and less than or equal to 0.6 mm. In the present specification, fourth distance $d_4$ in the plan view from upper surface 11 of base 10 is defined as a distance between second straight cutting edge portion 24c and the extension line of second base ridgeline 15b when upper surface 11 of base 10 is seen in the direction perpendicular to upper surface 11 of base 10. Fourth distance $d_4$ may be equal to third distance $d_3$.

First cutting edge part 24d may include a curved cutting edge portion 24b having a protruding curved shape. Particularly, curved cutting edge portion 24b may have a protruding arc shape. Curved cutting edge portion 24b may include extreme tip portion 30 of cutting edge member 20. Curved cutting edge portion 24b may be formed by first chamfer 21b and flank face 22. Curved cutting edge portion 24b is located between first straight cutting edge portion 24a and second straight cutting edge portion 24c. Curved cutting edge portion 24b is connected to first straight cutting edge portion 24a and second straight cutting edge portion 24c.

First cutting edge part 24d may include a third straight cutting edge portion 24e and a fourth straight cutting edge portion 24f. Third straight cutting edge portion 24e and fourth straight cutting edge portion 24f may be formed by first chamfer 21b and flank face 22. Third straight cutting edge portion 24e may be connected to first straight cutting edge portion 24a and curved cutting edge portion 24b. Fourth straight cutting edge portion 24f may be connected to second straight cutting edge portion 24c and curved cutting edge portion 24b.

In throwaway insert 1 of the present embodiment, cutting edge member 20 may include one of the following materials: diamond, cubic boron nitride, cemented carbide and cermet. Cutting edge member 20 including the diamond may be a diamond sintered material. Cutting edge member 20 including the cubic boron nitride (CBN) may be a cubic boron nitride (CBN) sintered material including more than or equal to 20 volume % of the cubic boron nitride (CBN). The cemented carbide may include, as a main component, tungsten carbide (WC) having at least one of cobalt (Co), titanium carbide (TiC), titanium nitride (TiN), and titanium carbonitride (TiCN) added therein. The cermet may include titanium carbide (TiC), titanium nitride (TiN), or titanium carbonitride (TiCN) as a main component. Cutting edge member 20 is composed of a material having a hardness higher than that of base 10.

Backing body 18 may be located between recess 14 of base 10 and cutting edge member 20. Backing body 18 is composed of a material having a toughness higher than that of cutting edge member 20. Accordingly, even when a large load acts on cutting edge 24 during cutting, part of this load can be absorbed by backing body 18. Backing body 18 prevents concentration of this load on cutting edge member 20, and prevents cutting edge 24 from being chipped during cutting. Backing body 18 can extend the life of throwaway insert 1. Throwaway insert 1 including backing body 18 has more stable quality. Cemented carbide may be used as a material of backing body 18.

As shown in FIG. 3, a side surface 18s of backing body 18 may be flush with flank face 22 of cutting edge member 20. As one modification of the present embodiment, side surface 18s of backing body 18 may be flush with the two side surfaces (13a, 13b) of base 10, and flank face 22 of cutting edge member 20 may protrude relative to the two side surfaces (13a, 13b) of base 10 and side surface 18s of backing body 18. Backing body 18 may be integrated with cutting edge member 20. Cutting edge member 20 and backing body 18 may be a composite sintered material obtained by sintering and shaping cutting edge member 20 and backing body 18 integrally.

The following describes an exemplary method of manufacturing throwaway insert 1 of the present embodiment. The composite sintered material is obtained by sintering and shaping cutting edge member 20 and backing body 18 integrally. This composite sintered material is joined to recess 14 of base 10 using a brazing material or the like with backing body 18 of this composite sintered material facing recess 14 of base 10. By grinding flank face 22 including the first ridgeline (24) without grinding base 10, cutting edge 24 is formed at the first ridgeline (24). In this way, throwaway insert 1 of the present embodiment can be manufactured.

The following describes an exemplary method of cutting a workpiece using throwaway insert 1 of the present embodiment. Throwaway insert 1 is held at a holder for cutting. The first ridgeline (24) serving as cutting edge 24 is brought into contact with a workpiece and the workpiece is rotated with respect to throwaway insert 1. In this way, the workpiece is cut using throwaway insert 1 of the present embodiment.

Figure 5:
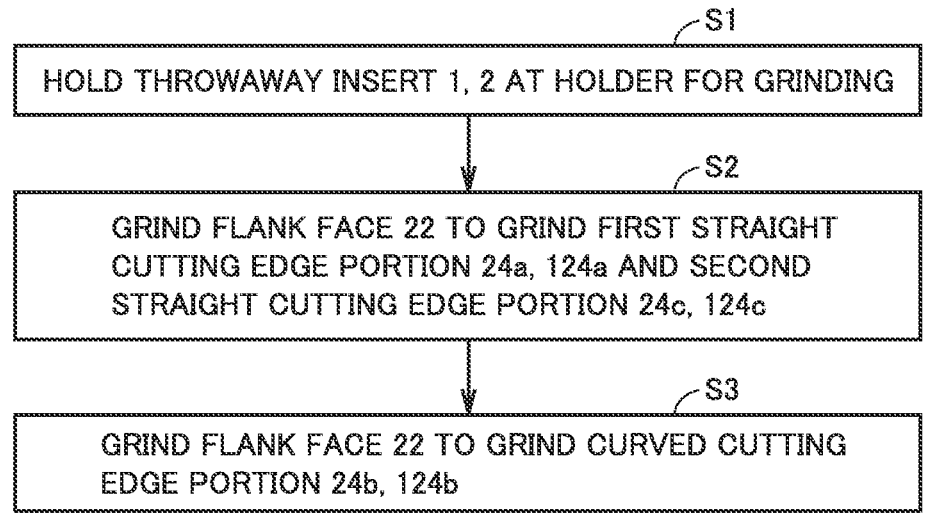
FIG. 5 shows a flowchart of a method of grinding each throwaway insert according to the first and second embodiments.

With reference to FIG. 5, the following describes an exemplary method of grinding cutting edge 24 of throwaway insert 1 of the present embodiment. Throwaway insert 1 is held at a holder for grinding (S1). Flank face 22 including cutting edge 24 is brought into contact with a grindstone to grind flank face 22. Specifically, first, flank face 22 may be ground to grind first straight cutting edge portion 24a and second straight cutting edge portion 24c (S2). On this occasion, third straight cutting edge portion 24e and fourth straight cutting edge portion 24f may also be ground. Then, flank face 22 may be ground to grind curved cutting edge portion 24b (S3). In this way, cutting edge 24 of throwaway insert 1 of the present embodiment is ground.

In throwaway insert 1 of the present embodiment, in the plan view from upper surface 11 of base 10, flank face 22, first connecting face 23, and second connecting face 26 are located external to base 10. Accordingly, as shown in FIG. 6, when a damage portion 40 is produced in cutting edge member 20 during cutting of a workpiece using throwaway insert 1, flank face 22 can be ground, thereby removing damage portion 40.

Figure 6:
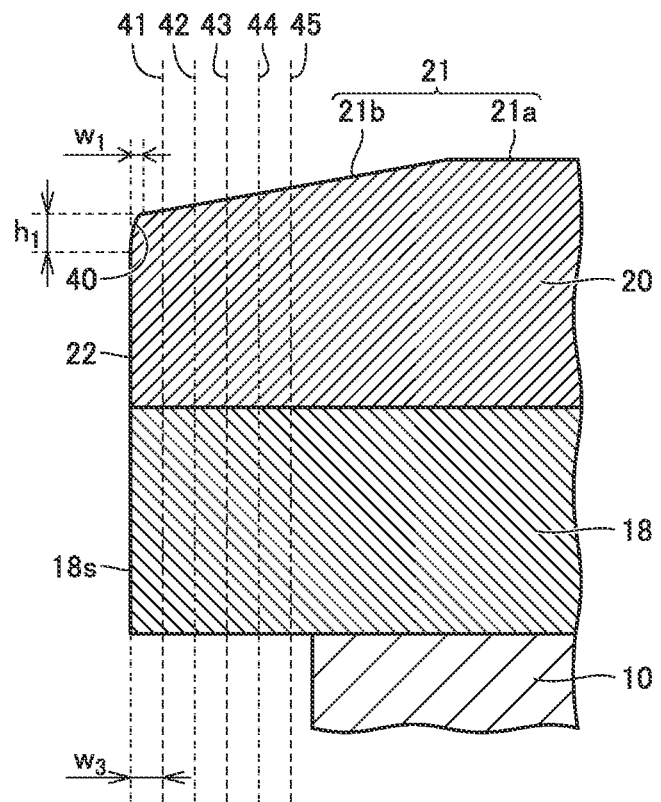
FIG. 6 is a schematic partial enlarged cross sectional view showing a method of grinding a first chamfer portion of the throwaway insert according to the first embodiment.
Figure 7:
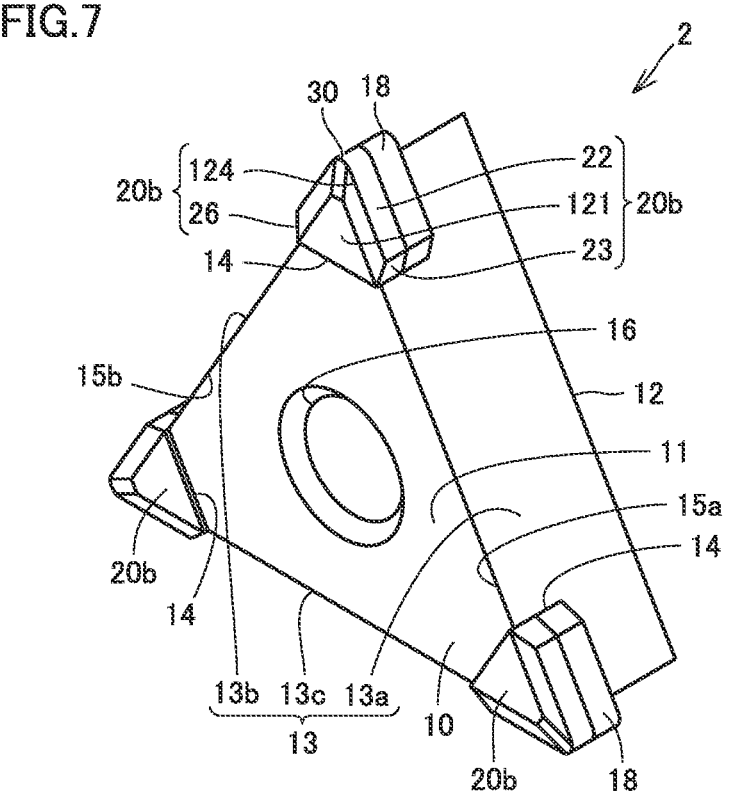
FIG. 7 is a schematic perspective view of the throwaway insert according to the second embodiment.
Figure 8:
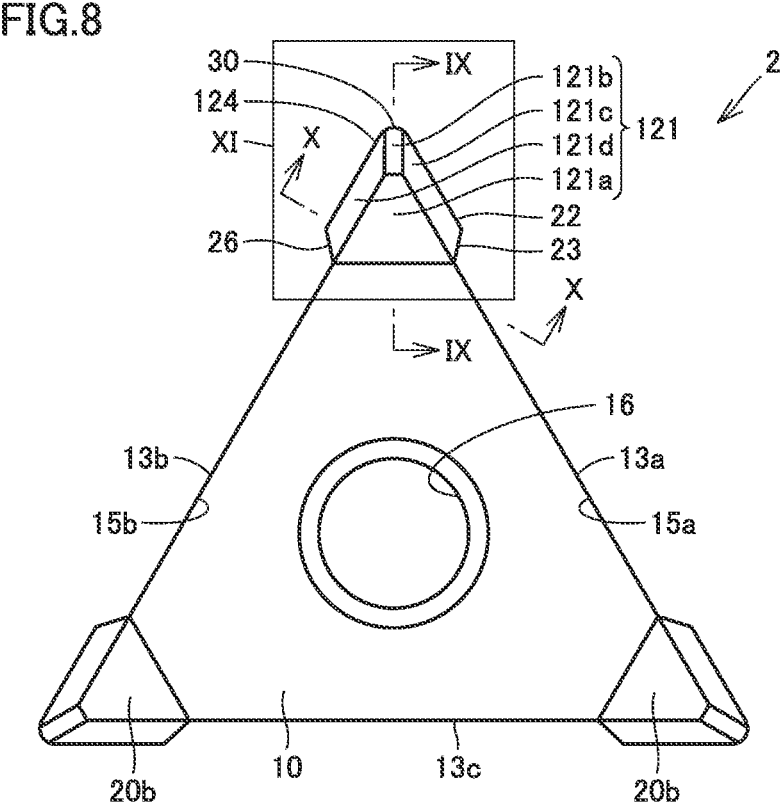
FIG. 8 is a schematic plan view of the throwaway insert according to the second embodiment.

Specifically, as shown in FIG. 6, during cutting of a workpiece using throwaway insert 1, a damage portion 40 having a width $w_1$ and a height $h_1$ is produced in cutting edge 24 (first cutting edge part 24d) formed by first chamfer 21b and flank face 22. By grinding flank face 22 by a grinding width $w_3$, i.e., by grinding flank face 22 to a grinding line 41, damage portion 40 can be removed. Grinding width $w_3$ is larger than width $w_1$ of damage portion 40.

Then, during cutting of a workpiece using throwaway insert 1, a damage portion 40 having width $w_1$ and height $h_1$ is produced again in cutting edge member 20. By grinding flank face 22 by grinding width $w_3$, i.e., by grinding flank face 22 to a grinding line 42, damage portion 40 can be removed. Likewise, whenever a damage portion 40 having width $w_1$ and height $h_1$ is produced in cutting edge member 20, flank face 22 is ground by grinding width $w_3$, thereby removing damage portion 40. Cutting edge member 20 can be ground five times to grinding lines 41, 42, 43, 44, 45, whereby throwaway insert 1 of the present embodiment can be reused five times.

Each of amounts of protrusion of flank face 22, first connecting face 23, and second connecting face 26 relative to the two side surfaces (13a, 13b) of base 10 in the plan view from upper surface 11 of base 10 is preferably such an amount of protrusion that throwaway insert 1 may be reused twice or more. Each of amounts of protrusion of flank face 22, first connecting face 23, and second connecting face 26 relative to the two side surfaces (13a, 13b) of base 10 in the plan view from upper surface 11 of base 10 may be more than or equal to 0.01 mm, for example.

As shown in FIG. 6, in throwaway insert 1 of the present embodiment, first chamfer 21b is inclined relative to main surface 21a so as to increase the thickness of cutting edge member 20 as first chamfer 21b is closer to main surface 21a. Accordingly, when flank face 22 is ground in order to remove damage portion 40, the thickness of cutting edge member 20 at the first ridgeline (24) serving as cutting edge 24 is increased.

The following describes functions and effects of throwaway insert 1 of the present embodiment.

Throwaway insert 1 of the present embodiment includes base 10 and cutting edge member 20. Base 10 has upper surface 11, lower surface 12, and the plurality of side surfaces 13 that connect upper surface 11 to lower surface 12, base 10 being provided with recess 14 at the corner portion at which upper surface 11 crosses two side surfaces (13a, 13b) of the plurality of side surfaces 13. Cutting edge member 20 is joined to recess 14. Cutting edge member 20 includes: rake face 21; flank face 22 extending to cross rake face 21; first connecting face 23; second connecting face 26; and the first ridgeline (24) serving as cutting edge 24. First connecting face 23 connects flank face 22 to one side surface 13a of the two side surfaces (13a, 13b), and extends to cross rake face 21. Second connecting face 26 connects flank face 22 to the other side surface 13b of the two side surfaces (13a, 13b), and extends to cross rake face 21. The first ridgeline (24) is formed by rake face 21 and flank face 22. Rake face 21 includes: main surface 21a extending along upper surface 11; and first chamfer 21b provided at the edge tip portion of cutting edge member 20, the edge tip portion including extreme tip portion 30 of cutting edge member 20. Cutting edge 24 includes first cutting edge part 24d constituted of the first ridgeline part (24d) formed by first chamfer 21b and flank face 22. In the plan view from upper surface 11 of base 10, flank face 22, first connecting face 23, and second connecting face 26 are located external to base 10. First chamfer 21b is inclined relative to main surface 21a so as to increase the thickness of cutting edge member 20 as first chamfer 21b is closer to main surface 21a.

In throwaway insert 1 of the present embodiment, first chamfer 21b is provided at the edge tip portion of cutting edge member 20, the edge tip portion including extreme tip portion 30 of cutting edge member 20. Accordingly, when cutting edge member 20 is ground and when a workpiece is cut using throwaway insert 1, damage portion 40 such as breakage and chipping can be suppressed from being produced in cutting edge 24. Throwaway insert 1 of the present embodiment has stable quality.

In throwaway insert 1 of the present embodiment, in the plan view from upper surface 11 of base 10, flank face 22, first connecting face 23, and second connecting face 26 are located external to base 10. Therefore, when damage portion 40 is produced in cutting edge 24 while cutting a workpiece using throwaway insert 1, damage portion 40 can be removed by grinding flank face 22 of cutting edge member 20.

Generally, width $w_1$ of damage portion 40 in the direction parallel to main surface 21a of rake face 21 is smaller than height $h_1$ of damage portion 40 in the direction perpendicular to main surface 21a of rake face 21. A required amount of grinding of cutting edge member 20 to remove damage portion 40 in throwaway insert 1 of the present embodiment in which flank face 22 is ground can be reduced as compared with a first comparative example in which rake face 21 is ground. In throwaway insert 1 of the present embodiment, the grinding of cutting edge member 20 to remove damage portion 40 in cutting edge member 20 can be performed a larger number of times. According to throwaway insert 1 of the present embodiment, the number of times of reusing cutting edge member 20 can be increased, whereby throwaway insert 1 of the present embodiment can be used economically.

In throwaway insert 1 of the present embodiment, first chamfer 21b is inclined relative to main surface 21a so as to increase the thickness of cutting edge member 20 as first chamfer 21b is closer to main surface 21a. Accordingly, when flank face 22 is ground in order to remove damage portion 40, the thickness of cutting edge member 20 at the first ridgeline (24) serving as cutting edge 24 is increased, whereby damage portion 40 is less likely to be produced in cutting edge 24. Throwaway insert 1 of the present embodiment has stable quality.

In throwaway insert 1 of the present embodiment, cutting edge member 20 including first chamfer 21b is ground only by grinding flank face 22 to remove damage portion 40. On the other hand, in the throwaway insert of the first comparative example, cutting edge member 20 including first chamfer 21b is ground by grinding rake face 21 to remove damage portion 40 and then grinding a portion of rake face 21 again to form first chamfer 21b. According to throwaway insert 1 of the present embodiment, cutting edge member 20 including first chamfer 21b is ground with a smaller number of grinding steps.

In throwaway insert 1 of the present embodiment, in the plan view from upper surface 11 of base 10, flank face 22, first connecting face 23, and second connecting face 26 are located external to base 10. Accordingly, flank face 22 can be ground without grinding base 10. According to throwaway insert 1 of the present embodiment, clogging in a grindstone and cracking in throwaway insert 1 can be prevented from occurring due to swarf of base 10 during grinding of cutting edge member 20.

In throwaway insert 1 of the present embodiment, in the plan view from upper surface 11 of base 10, flank face 22, first connecting face 23, and second connecting face 26 are located external to base 10. Therefore, cutting edge member 20 can be joined to base 10 at the entire surface of recess 14 of base 10. According to throwaway insert 1 of the present embodiment, cutting edge member 20 can be firmly joined to base 10.

In throwaway insert 1 of the present embodiment, first angle $\theta_1$ between first chamfer 21b and first extension plane 21e of main surface 21a may be more than or equal to 3° and less than or equal to 25°. By setting first angle $\theta_1$ to be more than or equal to 3°, damage portion 40 can be suppressed from being produced in cutting edge 24, and burr can be suppressed from being produced in a workpiece during cutting of the workpiece. Accordingly, throwaway insert 1 having stable quality can be provided.

By setting first angle $\theta_1$ to be less than or equal to 25°, the thickness of cutting edge member 20 can be prevented from being greatly varied before and after grinding of cutting edge member 20. The center height of cutting edge 24 can be prevented from being greatly varied before and after grinding of cutting edge member 20. Hence, even after grinding cutting edge member 20, the cutting edge strength can be secured and a workpiece can be cut with high cutting precision in the same manner as before grinding cutting edge member 20. The cutting performance of cutting edge member 20 can be suppressed from being deteriorated after grinding cutting edge member 20.

In throwaway insert 1 of the present embodiment, extreme tip portion 30 of cutting edge member 20 may be located on second extension plane 11e of upper surface 11. Accordingly, the center height of cutting edge 24 can be defined precisely. Even after grinding cutting edge member 20, a workpiece can be cut with high cutting precision in the same manner as before grinding cutting edge member 20. The cutting performance of cutting edge member 20 can be suppressed from being deteriorated after grinding cutting edge member 20.

In throwaway insert 1 of the present embodiment, second ridgeline 25 formed by rake face 21 and first connecting face 23 may cross the first ridgeline (24) at an obtuse angle. Third ridgeline 27 formed by rake face 21 and second connecting face 26 may cross the first ridgeline (24) at an obtuse angle. Therefore, as compared with a throwaway insert of a second comparative example in which second ridgeline 25 and third ridgeline 27 cross the first ridgeline (24) at an acute angle, according to throwaway insert 1 of the present embodiment, mechanical strength can be improved at a first end portion of cutting edge member 20 and a second end portion of cutting edge member 20. The first end portion of cutting edge member 20 is a region at which flank face 22 and first connecting face 23 cross each other, and the second end portion of cutting edge member 20 is a region at which flank face 22 and second connecting face 26 cross each other. In throwaway insert 1 of the present embodiment, the first end portion and second end portion of cutting edge member 20 can be suppressed from being chipped when grinding cutting edge member 20. Throwaway insert 1 of the present embodiment has stable quality.

Moreover, as compared with the throwaway insert of the second comparative example in which second ridgeline 25 and third ridgeline 27 cross the first ridgeline (24) at an acute angle, according to throwaway insert 1 of the present embodiment, a change in length of cutting edge 24 before and after grinding cutting edge member 20 can be made small. A change in cutting depth of cutting edge member 20 into a workpiece before and after grinding of cutting edge member 20 can be decreased.

In throwaway insert 1 of the present embodiment, cutting edge 24 may include: first straight cutting edge portion 24a located between first connecting face 23 and first cutting edge part 24d; and second straight cutting edge portion 24c located between second connecting face 26 and first cutting edge part 24d. When γ (degree) represents an angle between first straight cutting edge portion 24a and second straight cutting edge portion 24c in the plan view from upper surface 11 of base 10, each of a first crossing angle α (degree) between the first ridgeline (24) and second ridgeline 25 and a second crossing angle δ (degree) between the first ridgeline (24) and third ridgeline 27 may be more than or equal to (160-γ/2) and less than or equal to (200-γ/2).

Accordingly, the first length of first straight cutting edge portion 24a after grinding is substantially unchanged from the first length of first straight cutting edge portion 24a before grinding, and the second length of second straight cutting edge portion 24c after grinding is substantially unchanged from the second length of second straight cutting edge portion 24c before grinding. According to throwaway insert 1 of the present embodiment, a change in cutting depth of cutting edge member 20 into a workpiece before and after grinding of cutting edge member 20 can be further decreased.

In throwaway insert 1 of the present embodiment, cutting edge 24 includes: first straight cutting edge portion 24a located between first connecting face 23 and first cutting edge part 24d; and second straight cutting edge portion 24c located between second connecting face 26 and first cutting edge part 24d. First straight cutting edge portion 24a may be parallel to first base ridgeline 15a formed by upper surface 11 and one side surface 13a of base 10. Second straight cutting edge portion 24c may be parallel to second base ridgeline 15b formed by upper surface 11 and the other side surface 13b of base 10.

Each of the plurality of side surfaces 13 of base 10 is positioned precisely. First straight cutting edge portion 24a is parallel to first base ridgeline 15a included in one side surface 13a. Second straight cutting edge portion 24c is parallel to second base ridgeline 15b included in the other side surface 13b. Accordingly, when at least one of the two side surfaces (13a, 13b) of base 10 is bound to a holder for cutting or a holder for grinding, the at least one of the two side surfaces (13a, 13b) of base 10 may be used as a positional reference of cutting edge 24. Cutting edge 24 can be positioned relative to a workpiece with high precision. Precision in cutting a workpiece by throwaway insert 1 can be improved. Cutting edge 24 can be positioned relative to a grindstone with high precision. Precision in grinding cutting edge member 20 is improved, thereby obtaining high-quality cutting edge 24.

In throwaway insert 1 of the present embodiment, in the plan view from upper surface 11 of base 10, third distance $d_3$ between first straight cutting edge portion 24a and first base ridgeline 15a may be more than or equal to 0.01 mm and less than or equal to 1 mm. In the plan view from upper surface 11 of base 10, fourth distance $d_4$ between second straight cutting edge portion 24c and second base ridgeline 15b may be more than or equal to 0.01 mm and less than or equal to 1 mm.

By setting each of third distance $d_3$ and fourth distance $d_4$ to be less than or equal to 1 mm in the plan view from upper surface 11 of base 10, an amount of protrusion of cutting edge member 20 relative to base 10 can be prevented from being too large. The rigidity of cutting edge member 20 can be suppressed from being significantly decreased. When cutting a workpiece, cutting edge member 20 can be suppressed from being chipped. Throwaway insert 1 has stable quality. Moreover, since the rigidity of cutting edge member 20 can be suppressed from being significantly decreased, occurrence of chatter vibration can be prevented during cutting of a workpiece. The cutting precision can be suppressed from being decreased.

By setting each of third distance $d_3$ and fourth distance $d_4$ to be more than or equal to 0.01 mm, flank face 22 of cutting edge member 20 can be ground while securely preventing grinding of base 10. In throwaway insert 1 of the present embodiment, clogging in a grindstone and cracking in throwaway insert 1 can be prevented from occurring due to swarf of base 10 during grinding of cutting edge member 20.

In throwaway insert 1 of the present embodiment, first cutting edge part 24d may include a curved cutting edge portion 24b having a protruding curved shape. Curved cutting edge portion 24b may include extreme tip portion 30. Accordingly, damage portion 40 can be suppressed from being produced in extreme tip portion 30 of throwaway insert 1. Throwaway insert 1 of the present embodiment has stable quality.

In throwaway insert 1 of the present embodiment, cutting edge member 20 may include one of the following materials: diamond, cubic boron nitride, cemented carbide and cermet. Throwaway insert 1 of the present embodiment can be used to highly precisely cut workpieces having various hardnesses, such as high-hardness materials or non-iron soft metals.

Second Embodiment

With reference to FIG. 7 to FIG. 11, the following describes a throwaway insert 2 of a second embodiment. Throwaway insert 2 of the present embodiment includes the same configuration as that of throwaway insert 1 of the first embodiment, but is different therefrom in a configuration of a cutting edge member 20b.

Cutting edge member 20b includes: a rake face 121; flank face 22 extending to cross rake face 121; first connecting face 23; second connecting face 26; and a first ridgeline (124) serving as a cutting edge 124. First connecting face 23 connects flank face 22 to one side surface 13a of the two side surfaces (13a, 13b), and extends to cross rake face 121. Second connecting face 26 connects flank face 22 to the other side surface 13b of the two side surfaces (13a, 13b), and extends to cross rake face 121. The first ridgeline (124) is formed by rake face 121 and flank face 22.

Rake face 121 includes: a main surface 121a; a first chamfer 121b provided at an edge tip portion of cutting edge member 20b, the edge tip portion including an extreme tip portion 30 of cutting edge member 20b; and second chamfers 121c, 121d each connected to main surface 121a, first chamfer 121b, and flank face 22. Main surface 121a and first chamfer 121b of the present embodiment respectively have the same configurations as those of main surface 21a and first chamfer 21b of the first embodiment. Each of second chamfers 121c, 121d is inclined relative to main surface 121a so as to increase a thickness of cutting edge member 20b as each of second chamfers 121c, 121d is closer to main surface 121a. Second chamfer 121c may be connected to first connecting face 23. Second chamfer 121d may be connected to second connecting face 26.

Figure 11:
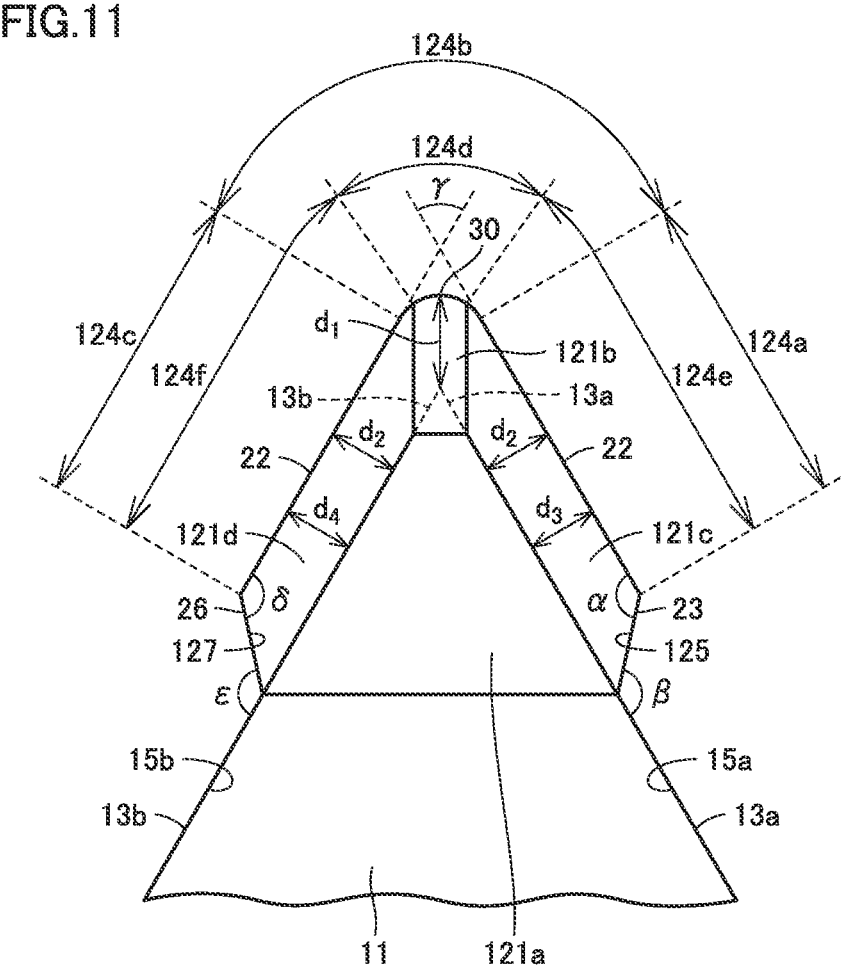
FIG. 11 is a schematic enlarged plan view of the throwaway insert according to the second embodiment at a region XI shown in FIG. 8.

As shown in FIG. 11, cutting edge member 20b further includes: a second ridgeline 125 formed by rake face 121 and first connecting face 23; and a third ridgeline 127 formed by rake face 121 and second connecting face 26. Second ridgeline 125 may be formed by second chamfer 121c and first connecting face 23. Third ridgeline 127 may be formed by second chamfer 121c and second connecting face 26.

Cutting edge 124 includes a first cutting edge part 124d and second cutting edge parts 124e, 124f. First cutting edge part 124d is constituted of a first ridgeline part (124d) formed by first chamfer 121b and flank face 22. Second cutting edge parts 124e, 124f are constituted of second ridgeline parts (124e, 124f) formed by second chamfers 121c, 121d and flank face 22. First cutting edge part 124d is located between second cutting edge part 124e and second cutting edge part 124f. First cutting edge part 124d is connected to second cutting edge part 124e and second cutting edge part 124f.

In the plan view from upper surface 11 of base 10, a first distance $d_1$ between extreme tip portion 30 of cutting edge member 20b and base 10 is larger than a second distance $d_2$ between each of second cutting edge parts 124e, 124f and base 10. In the present specification, second distance $d_2$ is defined as a minimum distance between each of second cutting edge parts 124e, 124f and an extension line of first base ridgeline 15a when upper surface 11 of base 10 is seen in the direction perpendicular to upper surface 11 of base 10.

Figure 9:
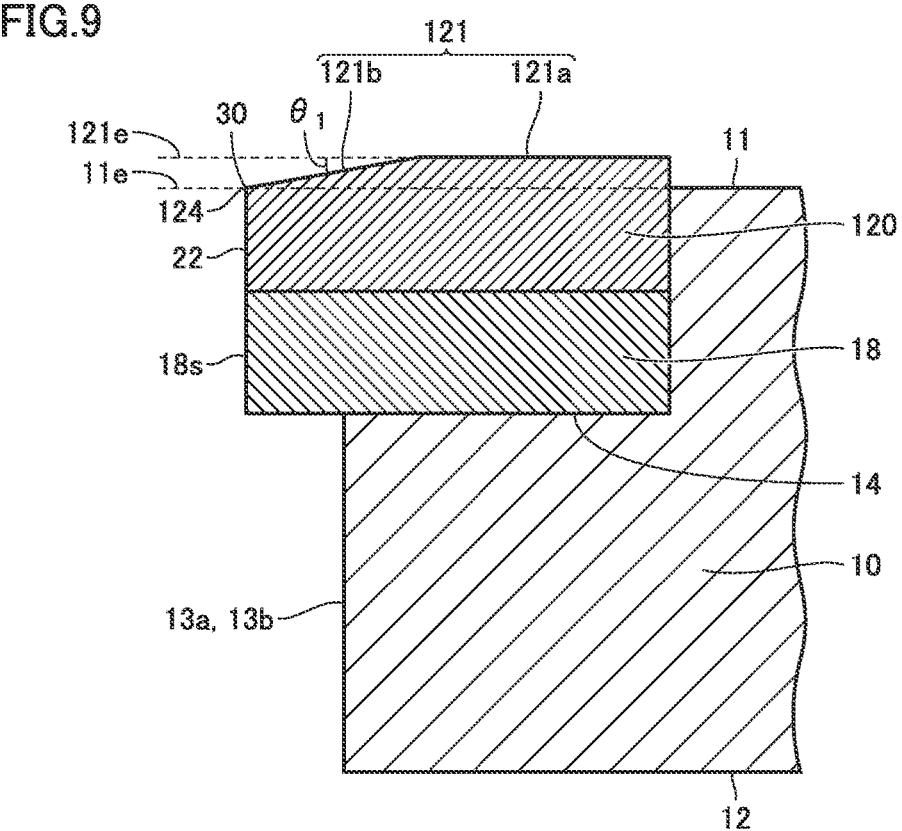
FIG. 9 is a schematic partial cross sectional view of the throwaway insert according to the second embodiment along a cross sectional line IX-IX shown in FIG. 8.
Figure 10:
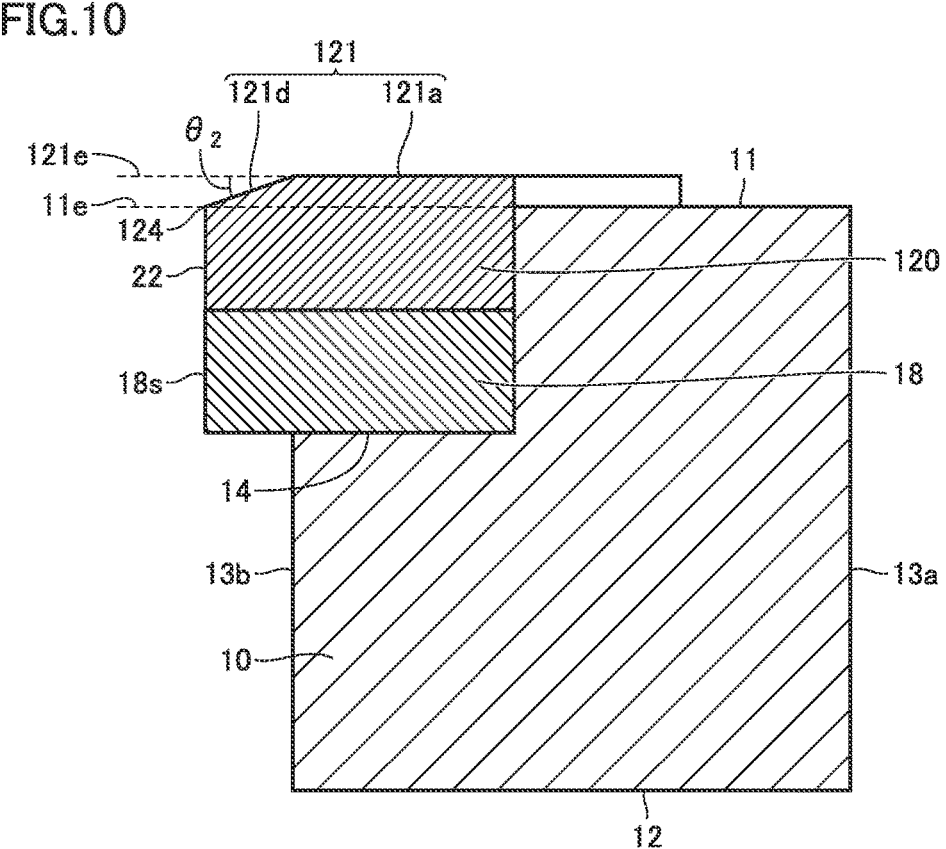
FIG. 10 is a schematic partial cross sectional view of the throwaway insert according to the second embodiment along a cross sectional line X-X shown in FIG. 8.

As shown in FIG. 9 and FIG. 10, a first angle $\theta_1$ between first chamfer 121b and first extension plane 121e of main surface 121a is smaller than a second angle θ2 between each of second chamfers 121c, 121d and first extension plane 121e of main surface 121a. First angle $\theta_1$ may be more than or equal to 3°, may be preferably more than or equal to 5°, and may be more preferably more than or equal to 7°. First angle $\theta_1$ may be less than or equal to 25°, may be preferably less than or equal to 15°, and may be more preferably less than or equal to 10°.

Second angle $\theta_2$ may be more than or equal to 3°, may be preferably more than or equal to 10°, and may be more preferably more than or equal to 12°. By setting second angle $\theta_2$ to be more than or equal to 3°, a damage portion 140 (see FIG. 13) such as breakage and chipping can be further suppressed from being produced in cutting edge 124. Accordingly, throwaway insert 2 having stable quality can be provided.

Second angle $\theta_2$ may be less than or equal to 25°, may be preferably less than or equal to 20°, and may be more preferably less than or equal to 18°. By setting second angle $\theta_2$ to be less than or equal to 25°, the thickness of cutting edge member 20b can be prevented from being greatly varied before and after grinding of cutting edge member 20b. The center height of cutting edge 124 can be prevented from being greatly varied before and after grinding of cutting edge member 20b. Accordingly, even after grinding cutting edge member 20b, a workpiece can be cut with high cutting precision in the same manner as before grinding cutting edge member 20b. The cutting performance of cutting edge member 20b can be suppressed from being deteriorated after grinding cutting edge member 20b.

As shown in FIG. 11, cutting edge 124 includes: a first straight cutting edge portion 124a located between first connecting face 23 and first cutting edge part 124d; and a second straight cutting edge portion 124c located between second connecting face 26 and first cutting edge part 124d. First straight cutting edge portion 124a and second straight cutting edge portion 124c may be formed by second chamfers 121c, 121d and flank face 22.

As shown in FIG. 11, in the plan view from upper surface 11 of base 10, a first distance $d_1$ between extreme tip portion 30 of cutting edge member 20b and base 10 is larger than a third distance $d_3$ between first straight cutting edge portion 124a and first base ridgeline 15a. In the plan view from upper surface 11 of base 10, first distance $d_1$ between extreme tip portion 30 of cutting edge member 20b and base 10 is larger than a fourth distance $d_4$ between second straight cutting edge portion 124c and second base ridgeline 15b.

First straight cutting edge portion 124a may be parallel to first base ridgeline 15a formed by upper surface 11 and one side surface 13a of base 10. Second straight cutting edge portion 124c may be parallel to second base ridgeline 15b formed by upper surface 11 and the other side surface 13b of base 10.

In the plan view from upper surface 11 of base 10, third distance $d_3$ between first straight cutting edge portion 124a and first base ridgeline 15a is desirably more than or equal to 0.01 mm and less than or equal to 1 mm, and is more desirably more than or equal to 0.1 mm and less than or equal to 0.6 mm. In the plan view from upper surface 11 of base 10, fourth distance $d_4$ between second straight cutting edge portion 124c and second base ridgeline 15b is desirably more than or equal to 0.01 mm and less than or equal to 1 mm, and is more desirably more than or equal to 0.1 mm and less than or equal to 0.6 mm. Fourth distance $d_4$ in the plan view from upper surface 11 of base 10 may be equal to third distance $d_3$ in the plan view from upper surface 11 of base 10.

By setting each of third distance $d_3$ and fourth distance $d_4$ to be less than or equal to 1 mm in the plan view from upper surface 11 of base 10, the rigidity of cutting edge member 20b can be suppressed from being greatly decreased. Accordingly, when cutting a workpiece, chipping of cutting edge member 20b and decrease in cutting precision can be suppressed. By setting third distance $d_3$ and fourth distance $d_4$ to be more than or equal to 0.01 mm in the plan view from upper surface 11 of base 10, flank face 22 of cutting edge member 20b can be ground while securely preventing grinding of base 10. Clogging in a grindstone and cracking in throwaway insert 2 can be securely prevented from occurring due to swarf of base 10 during grinding of cutting edge member 20b.

When γ (degree) represents an angle between first straight cutting edge portion 124a and second straight cutting edge portion 124c in the plan view from upper surface 11 of base 10, each of a first crossing angle α (degree) between the first ridgeline (124) and second ridgeline 125 and a second crossing angle δ (degree) between the first ridgeline (124)

and third ridgeline 127 may be preferably more than or equal to (160-γ/2) and less than or equal to (200-γ/2), and may be more preferably more than or equal to (170-γ/2) and less than or equal to (190-γ/2). Therefore, a change in cutting depth of cutting edge member 20 into a workpiece before and after grinding of cutting edge member 20b can be decreased.

First cutting edge part 124d may include a curved cutting edge portion 124b having a protruding curved shape. Particularly, curved cutting edge portion 124b may have a protruding arc shape. Curved cutting edge portion 124b may include extreme tip portion 30 of cutting edge member 20b. Curved cutting edge portion 124b is formed by first chamfer 121b, portions of second chamfers 121c, 121d, and flank face 22. Curved cutting edge portion 124b is located between first straight cutting edge portion 124a and second straight cutting edge portion 124c. Curved cutting edge portion 124b is connected to first straight cutting edge portion 124a and second straight cutting edge portion 124c.

Second cutting edge part 124e may include a portion of curved cutting edge portion 124b and first straight cutting edge portion 124a. Second cutting edge part 124f may include a portion of curved cutting edge portion 124b and second straight cutting edge portion 124c. Extreme tip portion 30 of cutting edge member 20b is located between second cutting edge parts 124e, 124f. Accordingly, a larger amount of extreme tip portion 30 of cutting edge member 20b is ground than those of second cutting edge parts 124e, 124f.

With reference to FIG. 5, the following describes an exemplary method of grinding cutting edge 124 of throwaway insert 2 of the present embodiment. Throwaway insert 2 is held at a holder for grinding (S1). Flank face 22 including cutting edge 124 is brought into contact with a grindstone to grind flank face 22. Specifically, first, flank face 22 may be ground to grind first straight cutting edge portion 124a and second straight cutting edge portion 124c (S2). Then, flank face 22 may be ground to grind curved cutting edge portion 124b (S3). In this way, cutting edge 124 of throwaway insert 2 of the present embodiment is ground.

In throwaway insert 2 of the present embodiment, in the plan view from upper surface 11 of base 10, flank face 22, first connecting face 23, and second connecting face 26 are located external to base 10. Accordingly, as shown in FIG. 12 and FIG. 13, when damage portions 40, 140 such as breakage and chipping are produced in cutting edge member 20b during cutting of a workpiece using throwaway insert 2, flank face 22 of cutting edge member 20b can be ground, thereby removing damage portions 40, 140.

Figure 12:
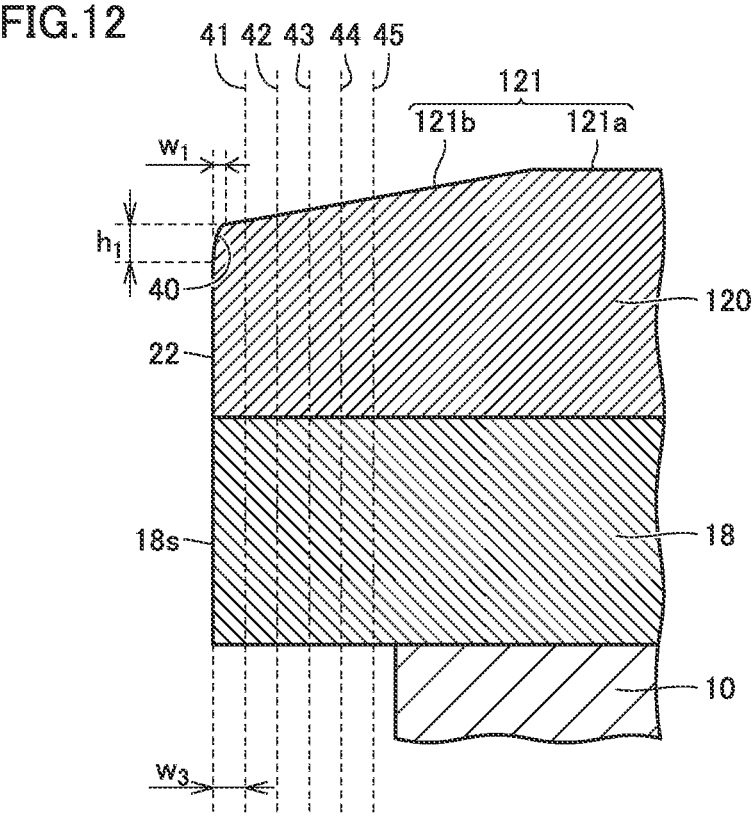
FIG. 12 is a schematic partial enlarged cross sectional view showing a method of grinding a first chamfer portion of the throwaway insert according to the second embodiment.

Specifically, as shown in FIG. 12, when a damage portion 40 having width $w_1$ and height $h_1$ is produced in cutting edge 124 (first cutting edge part 124d) formed by first chamfer 121b and flank face 22 during cutting of a workpiece using throwaway insert 2, damage portion 40 can be removed by grinding flank face 22 by a grinding width $w_3$, i.e., by grinding flank face 22 to a grinding line 41. Grinding width $w_3$ is larger than width $w_1$ of damage portion 40.

Then, during cutting of a workpiece using throwaway insert 2, when a damage portion 40 having width $w_1$ and height $h_1$ is produced again in cutting edge member 20b, damage portion 40 can be removed by grinding flank face 22 by grinding width $w_3$, i.e., by grinding flank face 22 to a grinding line 42. Likewise, whenever a damage portion 40 having width $w_1$ and height $h_1$ is produced in cutting edge member 20b, flank face 22 is ground by grinding width $w_3$, thereby removing damage portion 40. Cutting edge member 20b can be ground five times to grinding lines 41, 42, 43, 44, 45, whereby throwaway insert 2 of the present embodiment can be reused five times.

Figure 13:
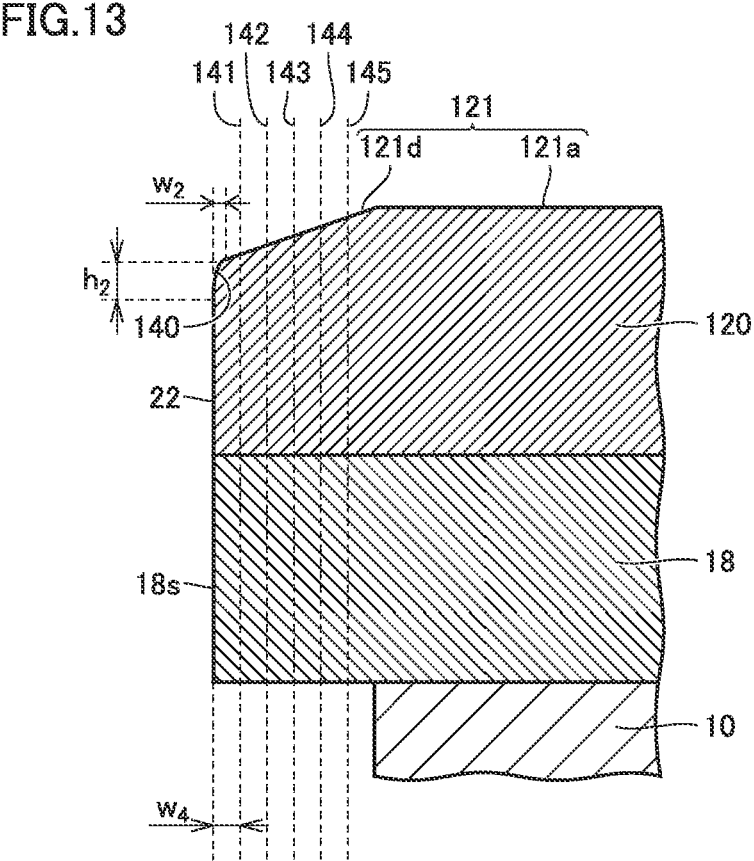
FIG. 13 is a schematic partial enlarged cross sectional view showing a method of grinding a second chamfer portion of the throwaway insert according to the second embodiment.
Figure 14:
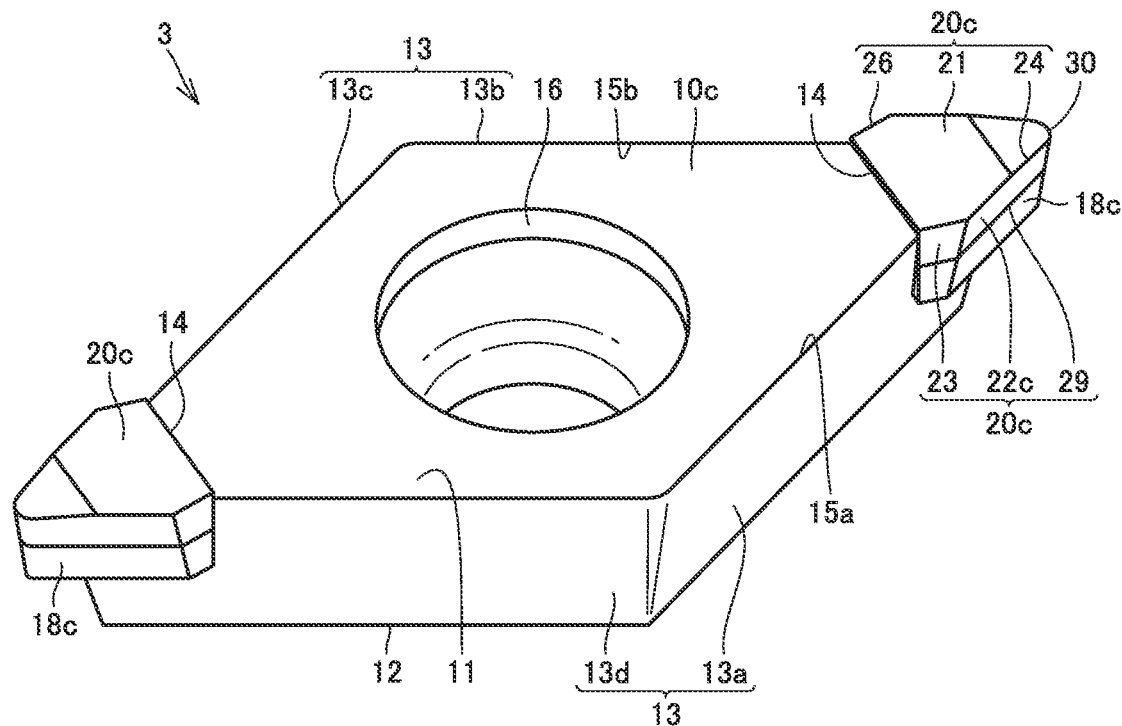
FIG. 14 is a schematic perspective view of a throwaway insert according to a third embodiment.
Figure 15:
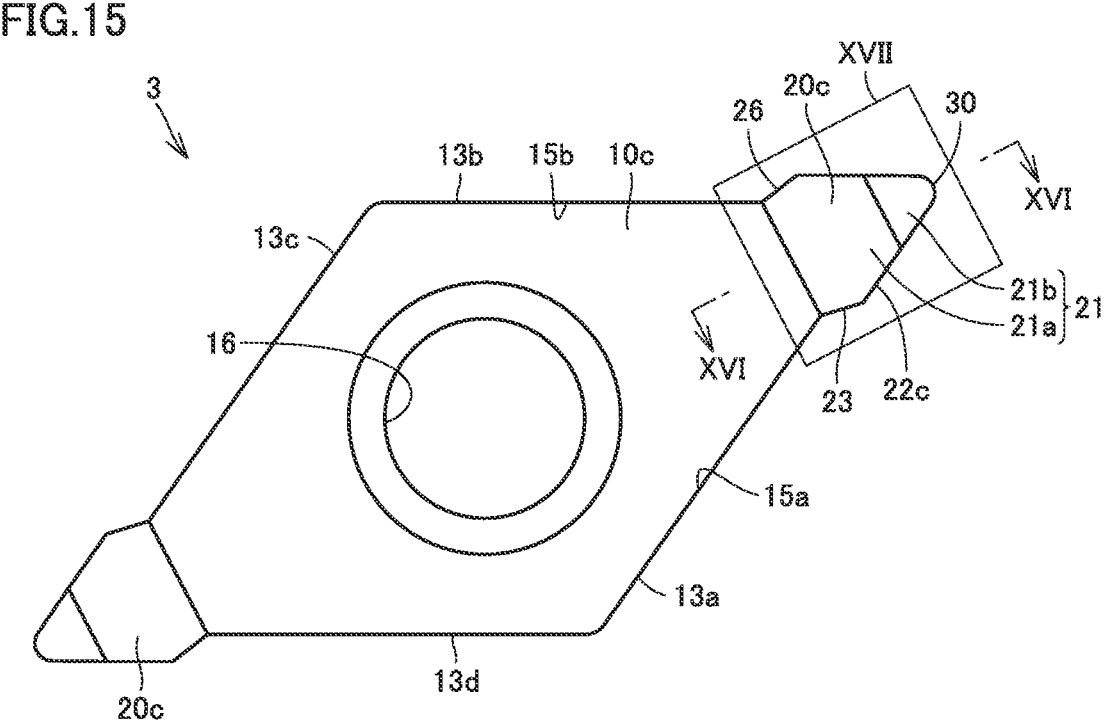
FIG. 15 is a schematic plan view of the throwaway insert according to the third embodiment.

As shown in FIG. 13, when a damage portion 140 having a width $w_2$ and a height $h_2$ is produced in cutting edge 124 (second cutting edge part 124f) formed by second chamfer 121d and flank face 22 during cutting of a workpiece using throwaway insert 2, damage portion 140 can be removed by grinding flank face 22 by a grinding width $w_4$, i.e., by grinding flank face 22 to a grinding line 141. Grinding width $w_4$ is larger than width $w_2$ of damage portion 140.

Then, during cutting of a workpiece using throwaway insert 2, when a damage portion 140 having width $w_2$ and height $h_2$ is produced again in cutting edge member 20, damage portion 140 can be removed by grinding flank face 22 by grinding width $w_4$, i.e., by grinding flank face 22 to a grinding line 142. Likewise, whenever a damage portion 140 having width $w_2$ and height $h_2$ is produced in cutting edge member 20b, flank face 22 of cutting edge member 20b is ground by grinding width $w_4$, thereby removing damage portion 140. Cutting edge member 20b can be ground five times to grinding lines 141, 142, 143, 144, 145, whereby throwaway insert 2 of the present embodiment can be reused five times. Although it has been described that damage portion 140 is produced in cutting edge 124 (second cutting edge part 124f) formed by second chamfer 121d and flank face 22, the same applies to a case where damage portion 140 is produced in cutting edge 124 (second cutting edge part 124e) formed by second chamfer 121c and flank face 22.

Extreme tip portion 30 of cutting edge member 20b is located between second cutting edge parts 124e, 124f. Therefore, grinding width $w_3$ at extreme tip portion 30 is larger than grinding width $w_4$ at cutting edge 124 (second cutting edge part 124f) formed by second chamfer 121d and flank face 22.

Each of amounts of protrusion of flank face 22, first connecting face 23, and second connecting face 26 relative to the two side surfaces (13a, 13b) of base 10 in the plan view from upper surface 11 of base 10 is preferably such an amount of protrusion that throwaway insert 2 can be reused twice or more. Each of amounts of protrusion of flank face 22, first connecting face 23, and second connecting face 26 relative to the two side surfaces (13a, 13b) of base 10 in the plan view from upper surface 11 of base 10 may be more than or equal to 0.01 mm, for example.

As shown in FIG. 12 and FIG. 13, in throwaway insert 2 of the present embodiment, each of second chamfers 121c, 121d is inclined relative to main surface 121a so as to increase the thickness of cutting edge member 20b as each of second chamfers 121c, 121d is closer to main surface 121a. Accordingly, when flank face 22 is ground in order to remove each of damage portions 40, 140, the thickness of cutting edge member 20b at the first ridgeline (124) serving as cutting edge 124 is increased.

The following describes functions and effects of throwaway insert 2 of the present embodiment. In addition to the effects of throwaway insert 1 of the first embodiment, throwaway insert 2 of the present embodiment exhibits the following effects.

In throwaway insert 2 of the present embodiment, rake face 121 further includes each of second chamfers 121c, 121d connected to main surface 121a, first chamfer 121b, and flank face 22. Each of second chamfers 121c, 121d is inclined relative to main surface 121a so as to increase the thickness of cutting edge member 20b as each of second chamfers 121c, 121d is closer to main surface 121a. Cutting edge 124 includes second cutting edge parts 124e, 124f constituted of the second ridgeline parts (124e, 124f) formed by second chamfers 121c, 121d and flank face 22. In the plan view from upper surface 11 of base 10, first distance $d_1$ between extreme tip portion 30 of cutting edge member 20b and base 10 is larger than second distance $d_2$ between each of second cutting edge parts 124e, 124f and base 10.

In throwaway insert 2 of the present embodiment, rake face 121 further includes second chamfers 121c, 121d. Accordingly, when cutting edge member 20b is ground and when a workpiece is cut using throwaway insert 2, damage portions 40, 140 can be suppressed from being produced in cutting edge 124. Throwaway insert 2 of the present embodiment has more stable quality.

In throwaway insert 2 of the present embodiment, in the plan view from upper surface 11 of base 10, flank face 22, first connecting face 23, and second connecting face 26 are located external to base 10. Therefore, when damage portions 40, 140 are produced in cutting edge 124 while cutting a workpiece using throwaway insert 2, damage portions 40, 140 can be removed by grinding flank face 22 of cutting edge member 20b.

Generally, widths $w_1$, $w_2$ of damage portions 40, 140 in the direction parallel to main surface 121a of rake face 121 are smaller than heights $h_1$, $h_2$ of damage portions 40, 140 in the direction perpendicular to main surface 121a of rake face 121. In throwaway insert 2 of the present embodiment, the grinding of cutting edge member 20b to remove damage portions 40, 140 in cutting edge member 20b can be performed a larger number of times. According to throwaway insert 2 of the present embodiment, the number of times of reusing cutting edge member 20b can be increased, whereby throwaway insert 2 of the present embodiment can be used economically.

In throwaway insert 2 of the present embodiment, each of second chamfers 121c, 121d is inclined relative to main surface 121a so as to increase the thickness of cutting edge member 20b as each of second chamfers 121c, 121d is closer to main surface 121a. Accordingly, when flank face 22 is ground in order to remove damage portions 40, 140, the thickness of cutting edge member 20b at the first ridgeline (124) serving as cutting edge 124 is increased, whereby damage portions 40, 140 are less likely to be produced in cutting edge 124. Throwaway insert 2 of the present embodiment has stable quality.

In throwaway insert 2 of the present embodiment, cutting edge member 20b including first chamfer 121b and second chamfers 121c, 121d can be ground only by grinding flank face 22 to remove damage portions 40, 140. On the other hand, in a throwaway insert of a third comparative example, cutting edge member 20b including first chamfer 21b and second chamfers 121c, 121d can be ground by grinding rake face 121 to remove damage portions 40, 140, then grinding a portion of rake face 121 to form second chamfers 121c, 121d, and further grinding a portion of rake face 121 to form first chamfer 121b. According to throwaway insert 2 of the present embodiment, cutting edge member 20b including first chamfer 21b and second chamfers 121c, 121d can be ground with a smaller number of grinding steps.

Extreme tip portion 30 of cutting edge member 20b is a portion used most to cut a workpiece, and is a portion at which damage portion 40 is most likely to be produced. Since first distance $d_1$ is larger than second distance $d_2$ in the plan view from upper surface 11 of base 10, the number of times of reusing cutting edge member 20b can be increased. Throwaway insert 2 of the present embodiment can be used economically.

In throwaway insert 2 of the present embodiment, first angle $\theta_1$ between first chamfer 121b and first extension plane 121e of main surface 121a is smaller than second angle $\theta_2$ between each of second chamfers 121c, 121d and first extension plane 121e of main surface 121a. Therefore, in the plan view from upper surface 11 of base 10, first distance $d_1$ is larger than second distance dz. According to throwaway insert 2 of the present embodiment, the number of times of reusing cutting edge member 20b can be increased, whereby throwaway insert 2 of the present embodiment can be used economically.

Third Embodiment

With reference to FIG. 14 to FIG. 17, the following describes a throwaway insert 3 of a third embodiment. Throwaway insert 3 of the present embodiment includes the same configuration as that of throwaway insert 1 of the first embodiment, but is different therefrom in respective configurations of a cutting edge member 20c, a backing body 18c, and a base 10c.

Figure 17:
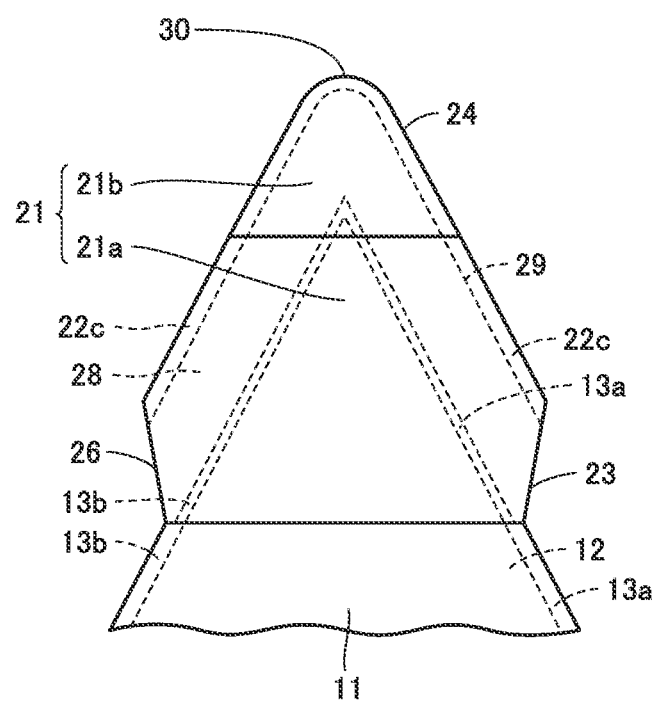
FIG. 17 is a schematic enlarged plan view of the throwaway insert according to the third embodiment at a region XVII shown in FIG. 15.
Figure 18:
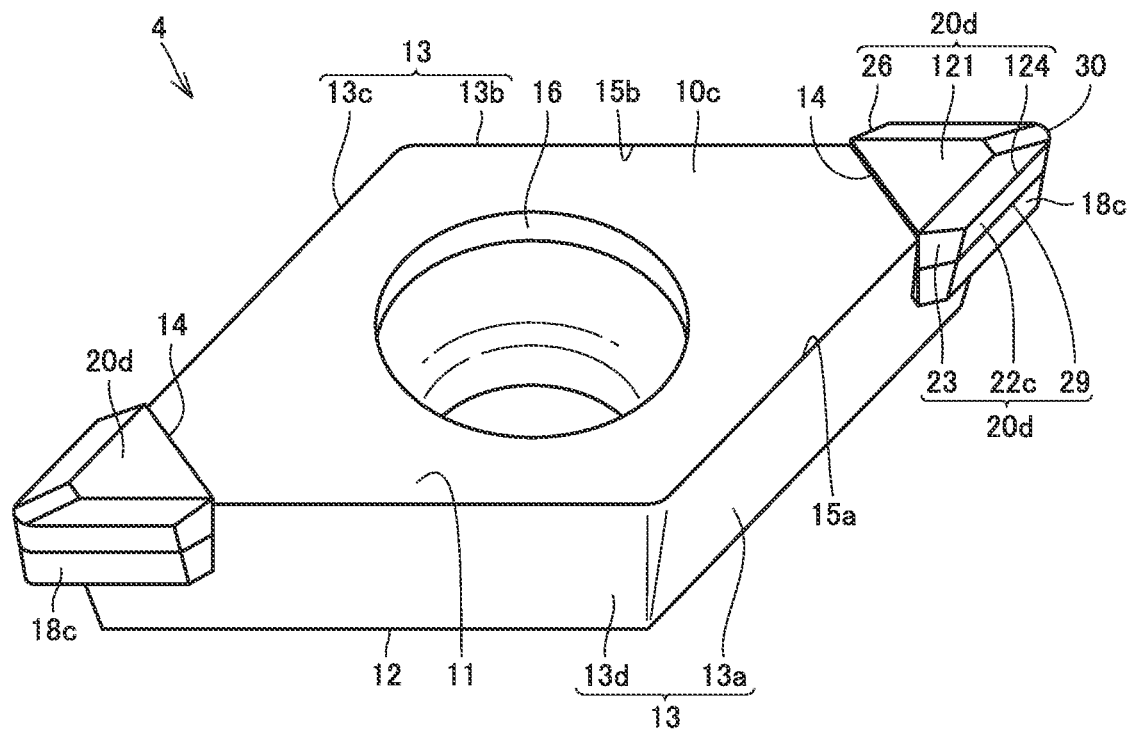
FIG. 18 is a schematic perspective view of a throwaway insert according to a fourth embodiment.
Figure 19:
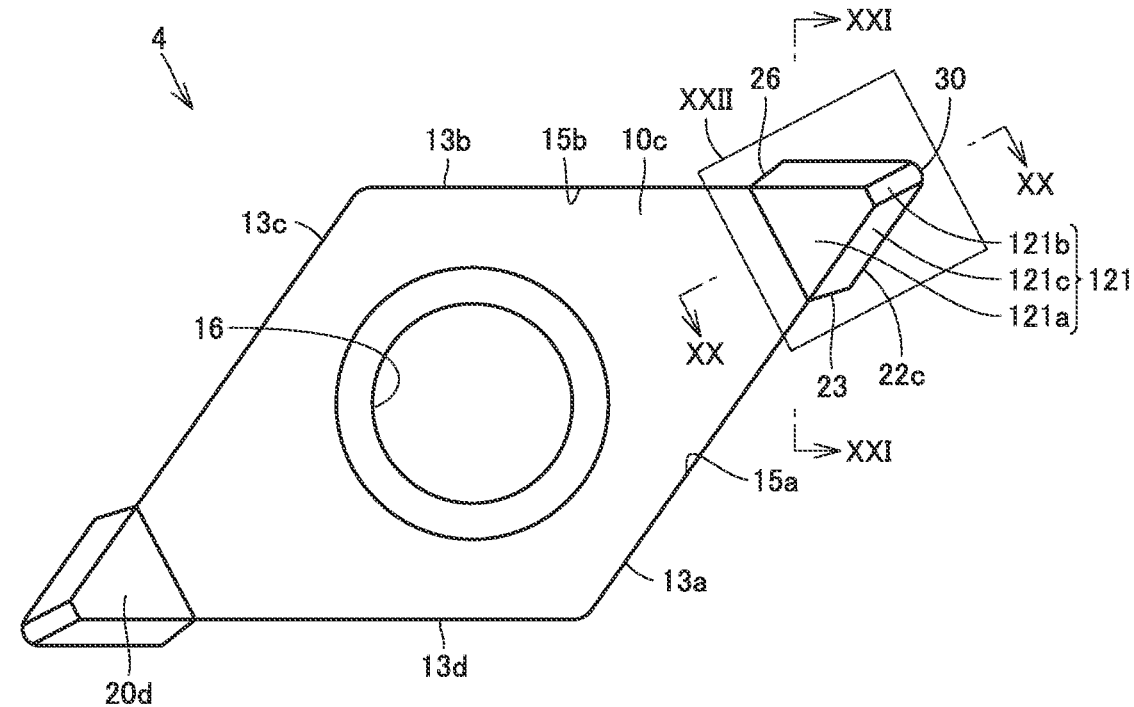
FIG. 19 is a schematic plan view of the throwaway insert according to the fourth embodiment.

As shown in FIG. 17, in throwaway insert 3 of the present embodiment, in the plan view from main surface 21a, a flank face 22c is inclined relative to main surface 21a so as to be closer to the two side surfaces (13a, 13b) of base 10c as flank face 22c is further away from main surface 21a. In the plan view from main surface 21a, a fourth ridgeline 29 is located at the two-side-surface (13a, 13b) side relative to cutting edge 24. Fourth ridgeline 29 is formed by flank face 22c and a bottom surface 28 of cutting edge member 20c opposite to rake face 21.

Figure 16:
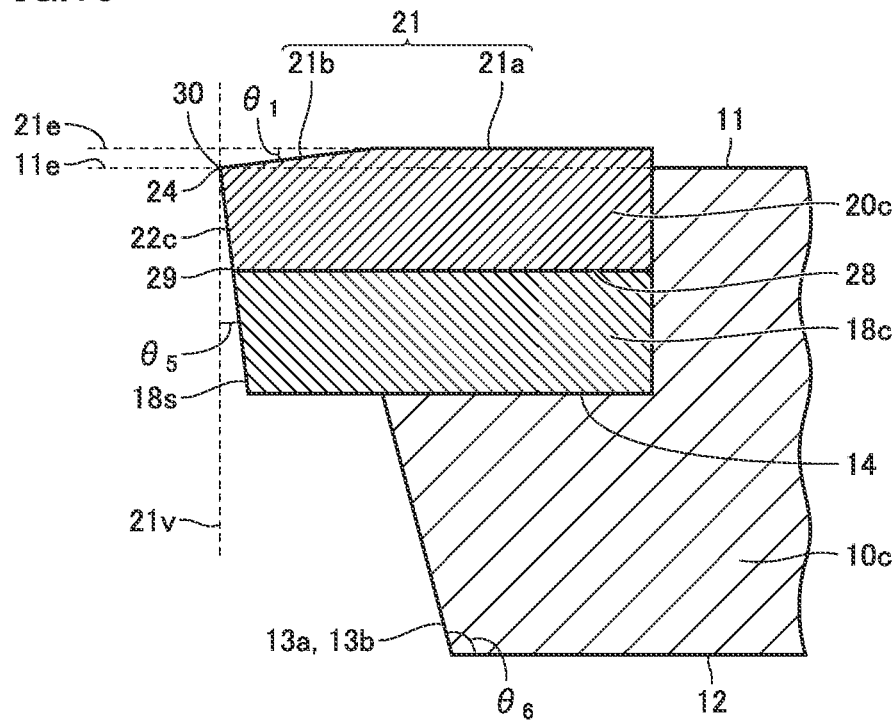
FIG. 16 is a schematic partial cross sectional view of the throwaway insert according to the third embodiment along a cross sectional line XVI-XVI shown in FIG. 15.

As shown in FIG. 16, in a cross section (cross section shown in FIG. 16) that is orthogonal to main surface 21a and that is orthogonal to the first ridgeline (24) in the plan view from main surface 21a, flank face 22c is inclined relative to main surface 21a so as to be closer to the two side surfaces (13a, 13b) of base 10c as flank face 22c is further away from main surface 21a. As shown in FIG. 16 and FIG. 17, flank face 22c is inclined relative to main surface 21a such that cutting edge member 20c gradually become thinner in a direction from rake face 21 toward bottom surface 28.

Flank face 22c may be inclined at an inclination angle $\theta_5$ of more than or equal to 0.1° and less than or equal to 15° relative to an imaginary plane 21v that is orthogonal to main surface 21a and that is in contact with the first ridgeline (24). Imaginary plane 21v is a plane parallel to flank face 22 of the first embodiment. In the cross section (cross section shown in FIG. 16) that is orthogonal to main surface 21a and that is orthogonal to the first ridgeline (24) in the plan view from main surface 21a, flank face 22c may be inclined at inclination angle $\theta_5$ of more than or equal to 0.1° and less than or equal to 15° relative to the normal line (21v) of main surface 21a so as to be closer to the two side surfaces (13a, 13b) of base 10c as flank face 22c is further away from main surface 21a.

In the plan view from main surface 21a, a side surface 18s of backing body 18c may be inclined in the same manner as flank face 22c. Side surface 18s of backing body 18c may be flush with flank face 22c of cutting edge member 20c. As one modification of the present embodiment, side surface 18s of backing body 18c may be flush with the two side surfaces (13a, 13b) of base 10c, and flank face 22c of cutting edge member 20c may protrude relative to the two side surfaces (13a, 13b) of base 10c and side surface 18s of backing body 18c.

In throwaway insert 3 of the present embodiment, base 10c has a rhombus shape in the plan view from upper surface 11 of base 10c. The plurality of side surfaces 13 may include side surface 13a, side surface 13b, side surface 13c, and a side surface 13d.

As shown in FIG. 17, in the plan view from upper surface 11, each of side surfaces 13a, 13b, 13c, 13d of base 10c is inclined relative to lower surface 12 so as to be further away from cutting edge 24 as each of side surfaces 13a, 13b, 13c, 13d of base 10c is further away from upper surface 11. As shown in FIG. 16 and FIG. 17, each of side surfaces 13a, 13b, 13c, 13d of base 10c is inclined relative to lower surface 12 such that base 10c becomes gradually thinner in a direction from upper surface 11 toward lower surface 12. Accordingly, side surfaces 13a, 13b, 13c, 13d of base 10c can be suppressed from being worn during cutting.

Each of side surfaces 13a, 13b 13c, 13d of base 10c may be inclined at an inclination angle θ6 (degree) relative to lower surface 12 in the cross section (cross section shown in FIG. 16) orthogonal to each of side surfaces 13a, 13b, 13c, 13d and lower surface 12. Regarding inclination angle $\theta_5$ (degree) and inclination angle $\theta_6$ (degree), $\theta_6$-90 may be equal to $\theta_5$ or may be larger than $\theta_5$.

The following describes functions and effects of throwaway insert 3 of the present embodiment. In addition to the effects of throwaway insert 1 of the first embodiment, throwaway insert 3 of the present embodiment exhibits the following effects.

In throwaway insert 3 of the present embodiment, flank face 22c is inclined relative to main surface 21a so as to be closer to the two side surfaces (13a, 13b) of base 10c as flank face 22c is further away from main surface 21a in the plan view from main surface 21a. Since flank face 22c is inclined in this way, a flank amount of flank face 22c relative to a workpiece can be increased. Flank face 22c is suppressed from being worn during cutting, whereby throwaway insert 3 has a longer life.

Further, since flank face 22c is inclined in this way, cuttability of cutting edge 24 is improved. Even though cutting edge member 20c protrudes relative to the two side surfaces (13a, 13b) of base 10c, occurrence of chatter vibration can be suppressed during cutting of a workpiece, thereby suppressing decrease of cutting precision.

In throwaway insert 3 of the present embodiment, flank face 22c is inclined at inclination angle $\theta_5$ of more than or equal to 0.1° and less than or equal to 15° relative to imaginary plane 21v that is orthogonal to main surface 21a and that is in contact with the first ridgeline (24). By setting inclination angle $\theta_5$ of flank face 22c to be more than or equal to 0.1°, wear of flank face 22c and occurrence of chatter vibration during cutting can be further suppressed. By setting inclination angle $\theta_5$ of flank face 22c to be less than or equal to 15°, flank face 22c can be ground using a grindstone without an interference of the grindstone with base 10c.

Fourth Embodiment

With reference to FIG. 18 to FIG. 22, the following describes a throwaway insert 4 of a fourth embodiment. Throwaway insert 4 of the present embodiment includes the same configuration as that of throwaway insert 2 of the second embodiment, but is different therefrom in respective configurations of a cutting edge member 20d, backing body 18c, and base 10c.

Figure 22:
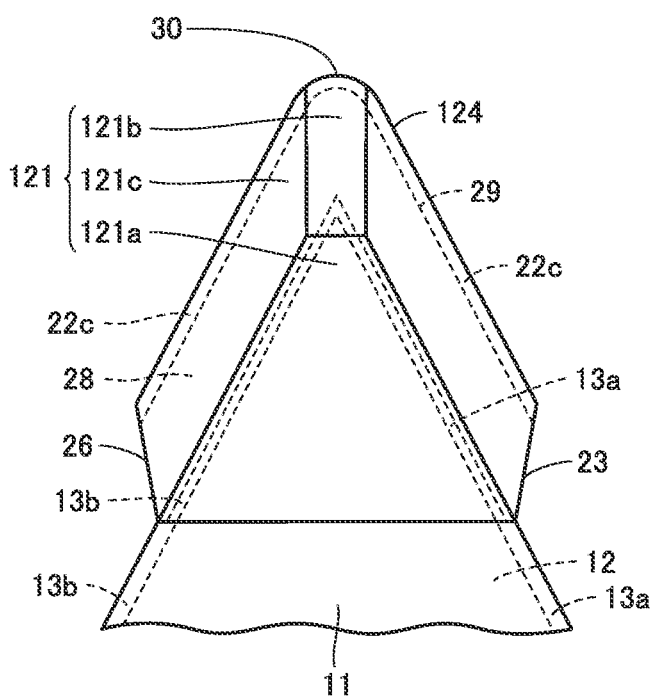
FIG. 22 is a schematic enlarged plan view of the throwaway insert according to the fourth embodiment at a region XXII shown in FIG. 19.

Flank face 22c of cutting edge member 20d of the present embodiment is inclined in the same manner as flank face 22c of cutting edge member 20c of the third embodiment. Specifically, as shown in FIG. 22, flank face 22c is inclined relative to main surface 121a so as to be closer to the two side surfaces (13a, 13b) of base 10c as flank face 22c is further away from main surface 121a in the plan view from main surface 121a. In the plan view from main surface 121a, fourth ridgeline 29 is located at the two-side-surface (13a, 13b) side relative to cutting edge 124. Fourth ridgeline 29 is formed by flank face 22c and a bottom surface 28 of cutting edge member 20d opposite to rake face 121.

Figure 20:
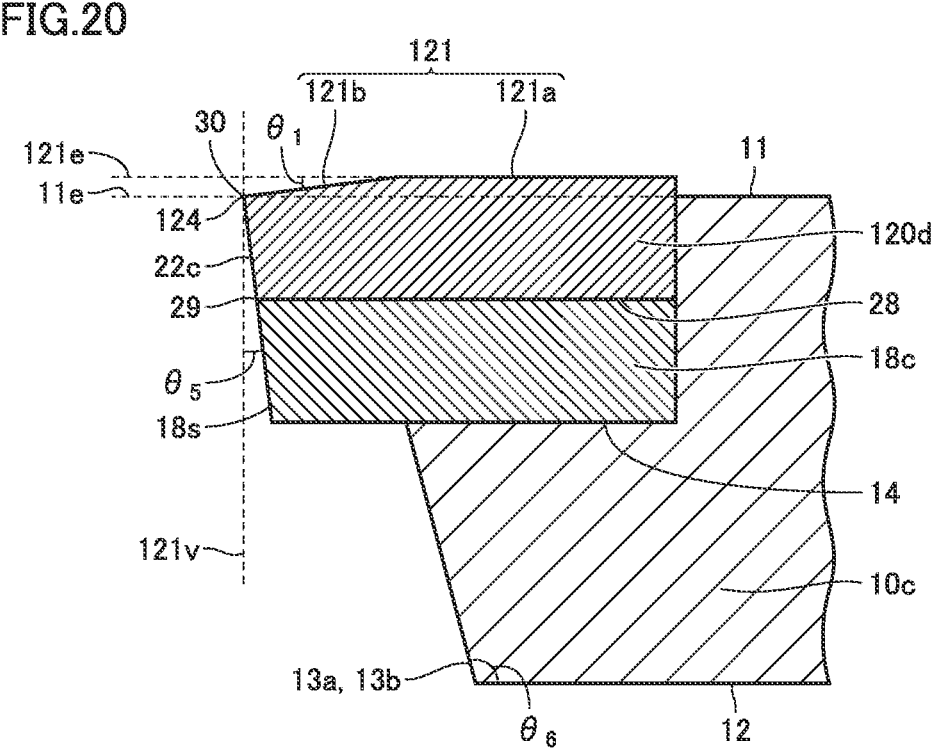
FIG. 20 is a schematic partial cross sectional view of the throwaway insert according to the fourth embodiment along a cross sectional line XX-XX shown in FIG. 19.
Figure 21:
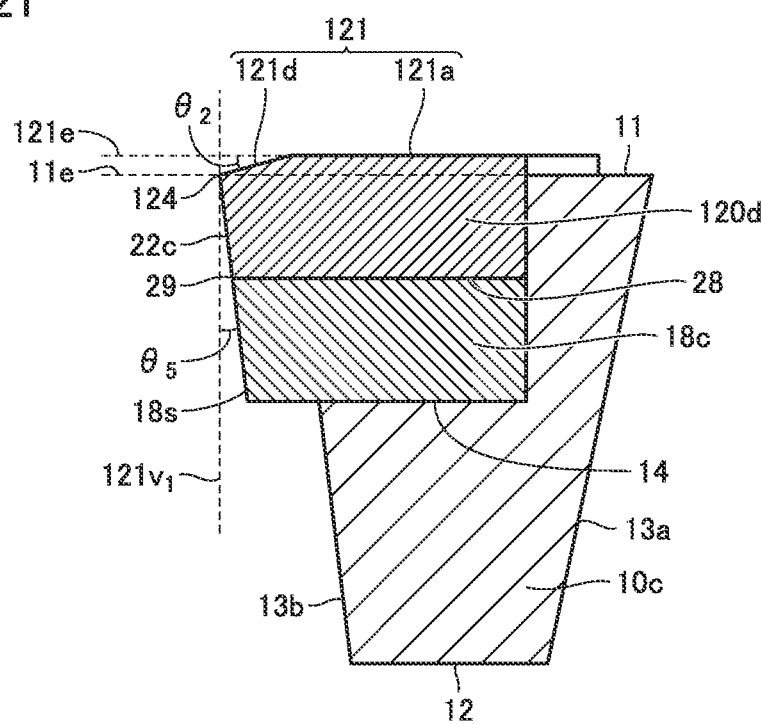
FIG. 21 is a schematic partial cross sectional view of the throwaway insert according to the fourth embodiment along a cross sectional line XXI-XXI shown in FIG. 19.

As shown in FIG. 20 and FIG. 21, in a cross section (each of a cross section shown in FIG. 20 and a cross section shown in FIG. 21) that is orthogonal to main surface 121a and that is orthogonal to the first ridgeline (124) in the plan view from main surface 121a, flank face 22c is inclined relative to main surface 121a so as to be closer to the two side surfaces (13a, 13b) of base 10c as flank face 22c is further away from main surface 121a. As shown in FIG. 20 to FIG. 22, flank face 22c is inclined relative to main surface 121a such that cutting edge member 20d gradually becomes thinner in a direction from rake face 121 toward bottom surface 28.

Flank face 22c may be inclined at an inclination angle $\theta_5$ of more than or equal to 0.1° and less than or equal to 15° relative to an imaginary plane 121v that is orthogonal to main surface 121a and that is in contact with the first ridgeline (124). Imaginary plane 121v is a plane parallel to flank face 22 of the second embodiment. In the cross section (each of the cross section shown in FIG. 20 and the cross section shown in FIG. 21) that is orthogonal to main surface 121a and that is orthogonal to the first ridgeline (124) in the plan view from main surface 121a, flank face 22c may be inclined at inclination angle $\theta_5$ of more than or equal to 0.1° and less than or equal to 15° relative to the normal line (121v) of main surface 121a so as to be closer to the two side surfaces (13a, 13b) of base 10c as flank face 22c is further away from main surface 121a.

Side surface 18s of backing body 18c of the present embodiment is inclined in the same manner as side surface 18s of backing body 18c of the third embodiment. Base 10c of the present embodiment includes the same structure as that of base 10c of the third embodiment.

Throwaway insert 4 of the present embodiment exhibits the effect of throwaway insert 2 of the second embodiment and the effect of throwaway insert 3 of the third embodiment.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST 1, 2, 3, 4: throwaway insert; 10, 10c: base; 11: upper surface; 11e: second extension plane; 12: lower surface; 12v: normal line; 13: plurality of side surfaces; 13a, 13b, 13c, 13d, 18s: side surface; 14: recess; 15a: first base ridgeline; 15b: second base ridgeline; 16: hole; 18, 18c: backing body; 20, 20b, 20c, 20d: cutting edge member; 21, 121: rake face; 21a, 121a: main surface; 21b, 121b: first chamfer; 21e, 121e: first extension plane; 21v: imaginary plane; 22, 22c: flank face; 23: first connecting face; 24, 124: cutting edge; 24a, 124a: first straight cutting edge portion; 24b, 124b: curved cutting edge portion; 24c, 124c: second straight cutting edge portion; 24d, 124d: first cutting edge part; 24e: third straight cutting edge portion; 24f: fourth straight cutting edge portion; 25, 125: second ridgeline; 26: second connecting face; 27, 127: third ridgeline; 28: bottom surface; 29: fourth ridgeline; 30: extreme tip portion; 40, 140: damage portion; 41, 42, 43, 44, 45, 141, 142, 143, 144, 145: grinding line; 121c, 121d: second chamfer; 124e, 124f: second cutting edge part.

The invention claimed is:

1. A throwaway insert comprising:
a base having an upper surface, a lower surface, and a plurality of side surfaces that connect the upper surface to the lower surface, the base being provided with a recess at a corner portion at which the upper surface crosses two side surfaces of the plurality of side surfaces; and
a cutting edge member joined to the recess, wherein
the cutting edge member includes
a rake face,
a flank face extending to cross the rake face,
a first connecting face connecting the flank face to one side surface of the two side surfaces and extending to cross the rake face,
a second connecting face connecting the flank face to the other side surface of the two side surfaces and extending to cross the rake face, and
a first ridgeline formed by the rake face and the flank face and serving as a cutting edge,
the rake face includes
a main surface extending along the upper surface, and
a first chamfer provided at an edge tip portion of the cutting edge member, the edge tip portion including an extreme tip portion of the cutting edge member,
the cutting edge includes a first cutting edge part constituted of a first ridgeline part formed by the first chamfer and the flank face,
in a plan view from the upper surface of the base, the flank face, the first connecting face, and the second connecting face are located external to the base,
the first chamfer is inclined relative to the main surface so as to increase a thickness of the cutting edge member as the first chamfer is closer to the main surface,
a second ridgeline formed by the rake face and the first connecting face crosses the first ridgeline at an obtuse angle, and
a third ridgeline formed by the rake face and the second connecting face crosses the first ridgeline at an obtuse angle.

2. The throwaway insert according to claim 1, wherein the rake face further includes a second chamfer connected to the main surface, the first chamfer, and the flank face,
the second chamfer is inclined relative to the main surface so as to increase the thickness of the cutting edge member as the second chamfer is closer to the main surface,
the cutting edge includes a second cutting edge part constituted of a second ridgeline part formed by the second chamfer and the flank face, and
in the plan view from the upper surface of the base, a first distance between the extreme tip portion of the cutting edge member and the base is larger than a second distance between the second cutting edge part and the base.

3. The throwaway insert according to claim 2, wherein a first angle between the first chamfer and a first extension plane of the main surface is smaller than a second angle between the second chamfer and the first extension plane of the main surface.

4. The throwaway insert according to claim 1, wherein a first angle between the first chamfer and a first extension plane of the main surface is more than or equal to 3° and less than or equal to 25°.

5. The throwaway insert according to claim 1, wherein the extreme tip portion of the cutting edge member is located on a second extension plane of the upper surface.

6. The throwaway insert according to claim 1, wherein in the plan view from the main surface, the flank face is inclined relative to the main surface so as to be closer to the two side surfaces of the base as the flank face is further away from the main surface.

7. The throwaway insert according to claim 6, wherein the flank face is inclined at an inclination angle of more than or equal to 0.1° and less than or equal to 15° relative to an imaginary plane that is orthogonal to the main surface and that is in contact with the first ridgeline.

8. The throwaway insert according to claim 1, wherein the cutting edge includes
a first straight cutting edge portion located between the first connecting face and the first cutting edge part, and
a second straight cutting edge portion located between the second connecting face and the first cutting edge part, and
when γ (degree) represents an angle between the first straight cutting edge portion and the second straight cutting edge portion in the plan view from the upper surface of the base, each of a first crossing angle α (degree) between the first ridgeline and the second ridgeline and a second crossing angle δ(degree) between the first ridgeline and the third ridgeline is more than or equal to (160-γ/2) and less than or equal to (200-γ/2).

9. The throwaway insert according to claim 1, wherein the cutting edge includes
a first straight cutting edge portion located between the first connecting face and the first cutting edge part, and
a second straight cutting edge portion located between the second connecting face and the first cutting edge part,
the first straight cutting edge portion is parallel to a first base ridgeline formed by the upper surface and the one side surface of the base, and
the second straight cutting edge portion is parallel to a second base ridgeline formed by the upper surface and the other side surface of the base.

10. The throwaway insert according to claim 9, wherein in the plan view from the upper surface of the base, a third distance between the first straight cutting edge portion and the first base ridgeline is more than or equal to 0.01 mm and less than or equal to 1 mm, and
in the plan view from the upper surface of the base, a fourth distance between the second straight cutting edge portion and the second base ridgeline is more than or equal to 0.01 mm and less than or equal to 1 mm.

11. The throwaway insert according to claim 1, wherein the first cutting edge part includes a curved cutting edge portion having a protruding curved shape, and the curved cutting edge portion includes the extreme tip portion.

12. The throwaway insert according to claim 1, wherein the cutting edge member includes one of the following materials: diamond, cubic boron nitride, cemented carbide and cermet.

* * * * *